(12) United States Patent
Yuan et al.

(10) Patent No.: US 9,256,361 B2
(45) Date of Patent: Feb. 9, 2016

(54) CONTROL OF SEARCH RESULTS WITH MULTIPOINT PINCH GESTURES

(75) Inventors: Han-Shen Yuan, Sunnyvale, CA (US); Ryan Melcher, Ben Lomond, CA (US); Steve Yankovich, San Jose, CA (US)

(73) Assignee: eBay Inc., San Jose, CA (US)

( * ) Notice: Subject to any disclaimer, the term of this patent is extended or adjusted under 35 U.S.C. 154(b) by 92 days.

(21) Appl. No.: 13/197,668

(22) Filed: Aug. 3, 2011

(65) Prior Publication Data

US 2013/0036382 A1 Feb. 7, 2013

(51) Int. Cl.

| G06F 3/048 | (2013.01) |
|---|---|
| G06F 3/0488 | (2013.01) |
| G06F 3/0482 | (2013.01) |
| G06F 3/01 | (2006.01) |
| G06F 3/0484 | (2013.01) |

(52) U.S. Cl.
CPC ............ *G06F 3/04883* (2013.01); *G06F 3/017* (2013.01); *G06F 3/0482* (2013.01); *G06F 3/0484* (2013.01); *G06F 3/0488* (2013.01)

(58) Field of Classification Search
CPC ... G06F 3/04883; G06F 3/017; G06F 3/0481; G06F 3/0488; G06F 2203/04807
USPC ......................................................... 715/815
See application file for complete search history.

(56) References Cited

U.S. PATENT DOCUMENTS

| 7,761,400 | B2 | 7/2010 | Reimer |
|---|---|---|---|
| 8,930,855 | B2 | 1/2015 | Yuan et al. |
| 2006/0048070 | A1* | 3/2006 | Taylor et al. ................... 715/773 |
| 2006/0156228 | A1* | 7/2006 | Gallo et al. ..................... 715/523 |
| 2006/0271887 | A1* | 11/2006 | Bier et al. ...................... 715/866 |
| 2007/0060112 | A1 | 3/2007 | Reimer |
| 2007/0147178 | A1* | 6/2007 | Masuda et al. ................... 368/29 |
| 2008/0086451 | A1 | 4/2008 | Torres et al. |
| 2008/0133319 | A1 | 6/2008 | Adiga et al. |
| 2008/0309632 | A1 | 12/2008 | Westerman et al. |
| 2009/0150791 | A1 | 6/2009 | Garcia et al. |
| 2009/0234815 | A1 | 9/2009 | Boerries et al. |
| 2010/0088641 | A1 | 4/2010 | Choi |
| 2010/0153259 | A1 | 6/2010 | Stanton |

(Continued)

FOREIGN PATENT DOCUMENTS

CN 103858084 A 6/2014

OTHER PUBLICATIONS

Definition of zoom. IEEE Dictionary Standards and Terms, 7th edition, 2000, p. 1293.*

(Continued)

*Primary Examiner* — Amy M Levy
(74) *Attorney, Agent, or Firm* — Schwegman Lundberg & Woessner, P.A.

(57) ABSTRACT

A device incorporates a touch-enabled screen configured to accept a user's interaction with the touch screen to control display of the results of online searches for information and ecommerce listings. A user's interaction with the touch screen of the device with multipoint pinch gestures facilitates navigation through large volumes of search results. Touch-enabled navigation with pinch gestures to elaborate or contract the results of a given search may present a more definitive view of those results or present a better indication of the requirement for a further search by the user. Listings of item data with elaborated or contracted details are produced through corresponding scaling processes which are in turn controlled through associated multipoint pinch gestures.

24 Claims, 16 Drawing Sheets

(56) References Cited

U.S. PATENT DOCUMENTS

| | | | |
|---|---|---|---|
| 2010/0162165 A1 | 6/2010 | Addala et al. | |
| 2010/0162181 A1 | 6/2010 | Shiplacoff et al. | |
| 2010/0174564 A1 | 7/2010 | Stender et al. | |
| 2010/0217760 A1* | 8/2010 | Melcher et al. | 707/722 |
| 2010/0259562 A1 | 10/2010 | Miyazawa et al. | |
| 2010/0283743 A1* | 11/2010 | Coddington | 345/173 |
| 2010/0325056 A1 | 12/2010 | Loveland | |
| 2011/0040657 A1 | 2/2011 | Roswell | |
| 2011/0069017 A1* | 3/2011 | Victor | 345/173 |
| 2011/0074828 A1 | 3/2011 | Capela et al. | |
| 2011/0087999 A1* | 4/2011 | Bichsel et al. | 715/845 |
| 2011/0145753 A1* | 6/2011 | Prakash | 715/783 |
| 2011/0167382 A1 | 7/2011 | Van Os | |
| 2011/0209100 A1 | 8/2011 | Hinckley et al. | |
| 2011/0247027 A1 | 10/2011 | Davis et al. | |
| 2011/0298732 A1* | 12/2011 | Yoshimoto et al. | 345/173 |
| 2011/0316884 A1* | 12/2011 | Giambalvo et al. | 345/660 |
| 2012/0151417 A1* | 6/2012 | Wong et al. | 715/851 |
| 2012/0192121 A1* | 7/2012 | Bonnat | 715/863 |
| 2012/0240037 A1* | 9/2012 | Migos et al. | 715/255 |
| 2013/0006957 A1* | 1/2013 | Huang et al. | 707/706 |
| 2013/0036383 A1 | 2/2013 | Yuan et al. | |
| 2014/0282247 A1 | 9/2014 | Yuan et al. | |

OTHER PUBLICATIONS

Definition of zooming. Dictionary of Computer Terms, Third Edition, Prentice Hall Press, 1988, p. 412.*

"U.S. Appl. No. 13/340,367, Notice of Allowance mailed Jan. 17, 2014", 14 pgs.

"International Application Serial No. PCT/US2012/049193, International Preliminary Report on Patentability mailed Feb. 13, 2014", 9 pgs.

"U.S. Appl. No. 13/340,367, Advisory Action mailed Nov. 9, 2012", 3 pgs.

"U.S. Appl. No. 13/340,367, Examiner Interview Summary mailed Jun. 21, 2012", 3 pgs.

"U.S. Appl. No. 13/340,367, Final Office Action mailed Aug. 16, 2012", 14 pgs.

"U.S. Appl. No. 13/340,367, Non Final Office Action mailed Mar. 28, 2012", 15 pgs.

"U.S. Appl. No. 13/340,367, Response filed Jun. 28, 2012 to Non Final Office Action mailed Mar. 28, 2012", 28 pgs.

"U.S. Appl. No. 13/340,367, Response filed Oct. 16, 2012 to Final Office Action mailed Aug. 16, 2012", 18 pgs.

"U.S. Appl. No. 13/340,367, Response filed Dec. 17, 2012 to Final Office Action mailed Aug. 16, 2012", 18 pgs.

"International Application Serial No. PCT/US2012/049193, Search Report mailed Oct. 25, 2012", 4 pgs.

"International Application Serial No. PCT/US2012/049193, Written Opinion mailed Oct. 25, 2012", 7 pgs.

"U.S. Appl. No. 13/340,367, Notice of Allowance mailed Sep. 20, 2013", 16 pgs.

US 8,745,543, 06/2014, Yuan, Han-Shen, et al. (withdrawn).

"U.S. Appl. No. 13/340,367, Notice of Allowance mailed Aug. 25, 2014", 13 pgs.

"U.S. Appl. No. 14/286,212, Preliminary Amendment filed Jun. 4, 2014", 9 pgs.

"European Application Serial No. 12754118.3, Office Action mailed Apr. 2, 2014", 2 pgs.

* cited by examiner

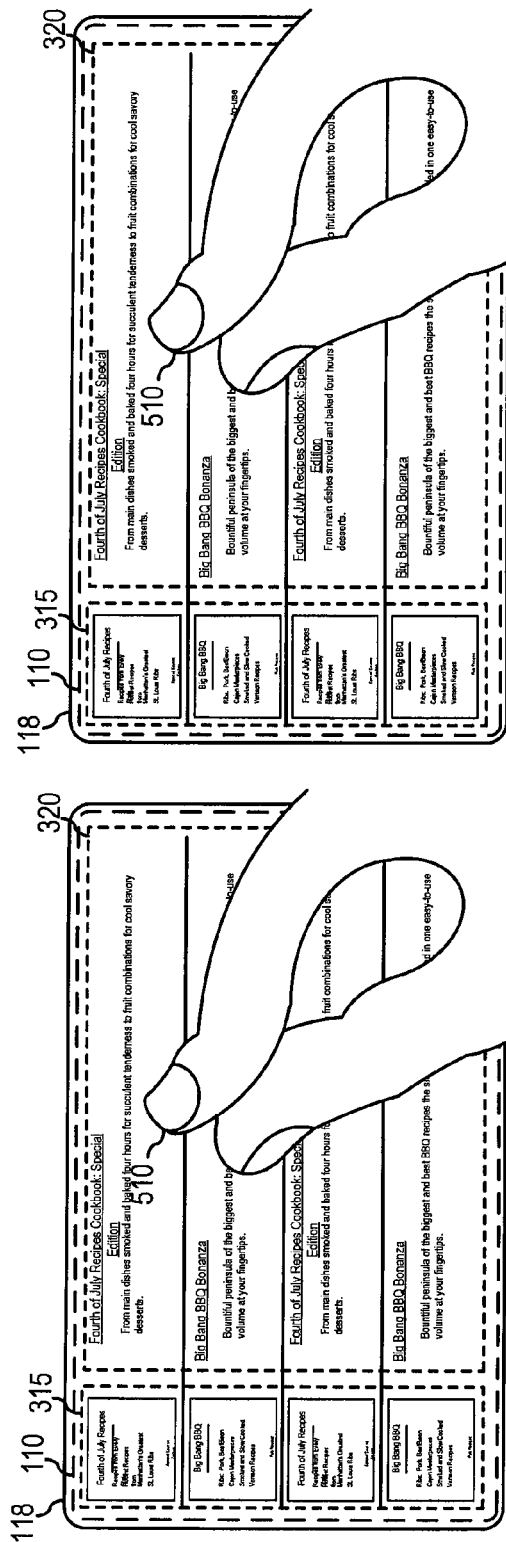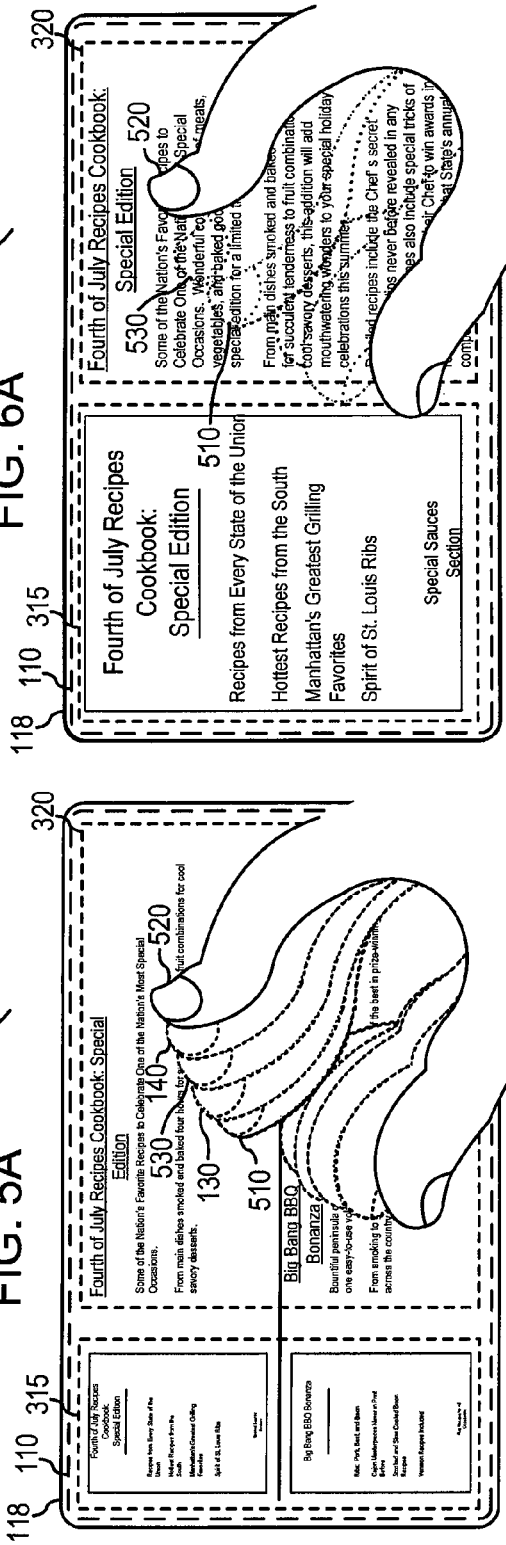

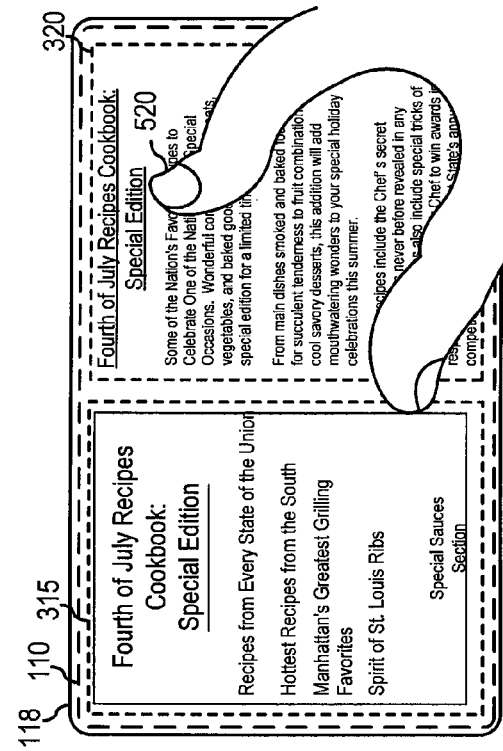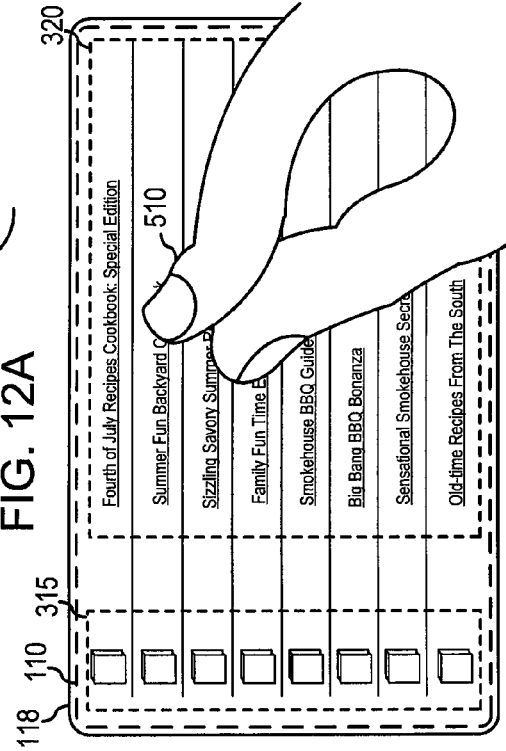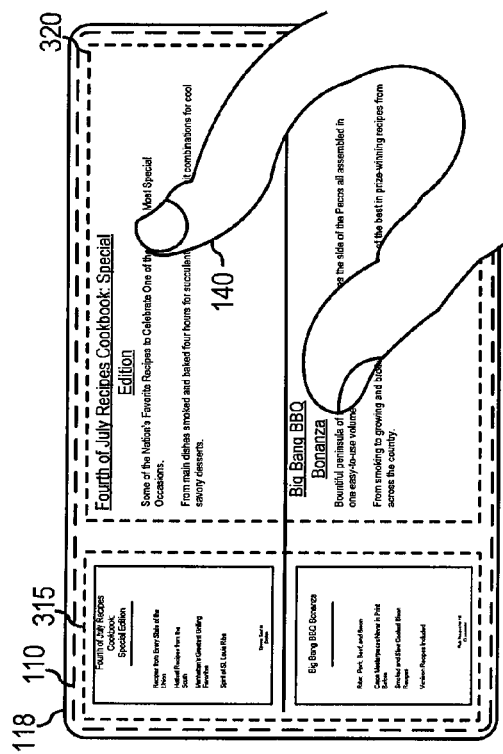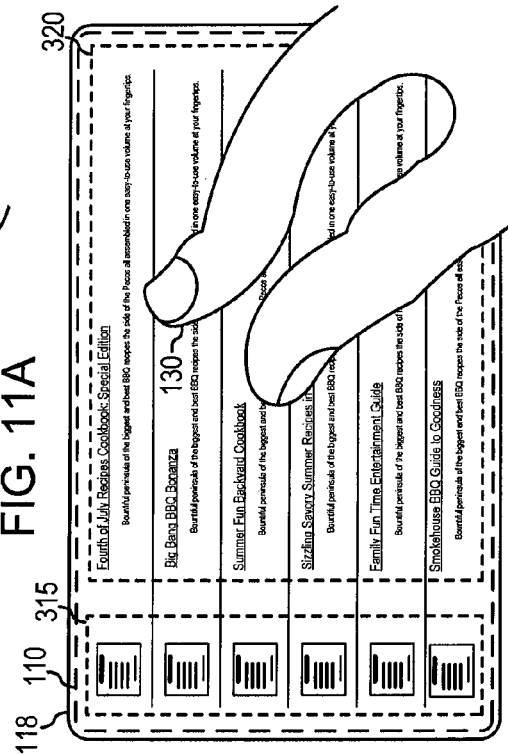

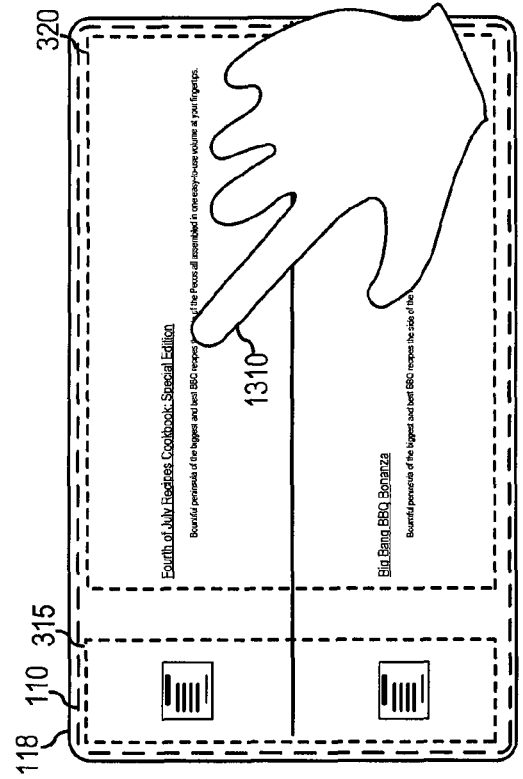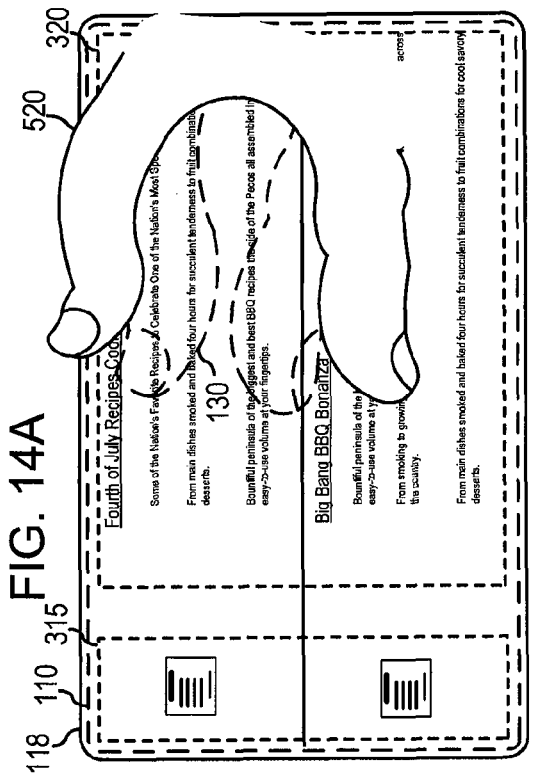
FIG. 13A  FIG. 13B
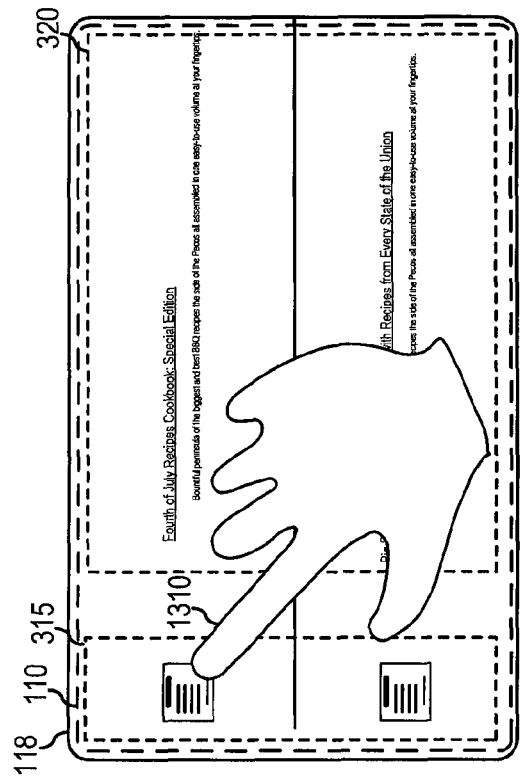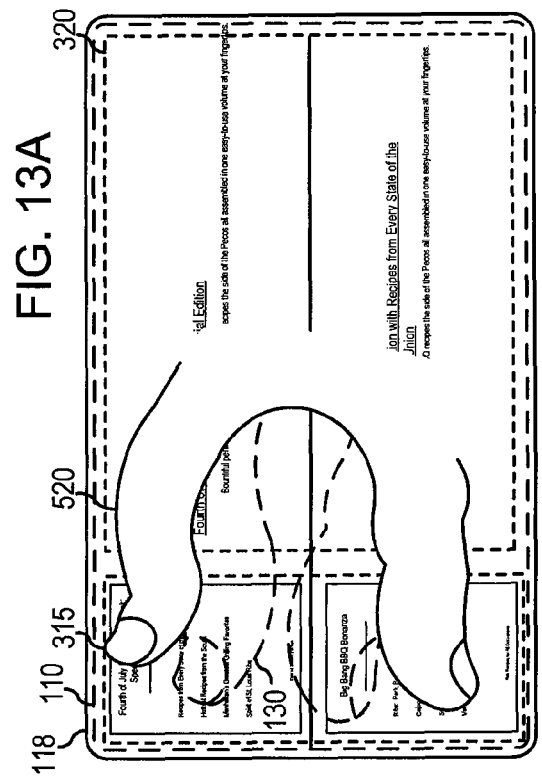
FIG. 14A  FIG. 14B

CONTROL OF SEARCH RESULTS WITH MULTIPOINT PINCH GESTURES

TECHNICAL FIELD

This application relates to the technical fields of search results display and, in one example embodiment, the control of search results with multipoint pinch gestures.

BACKGROUND

Users of the World Wide Web may typically perform a significant number of searches in pursuit of general information and online commerce. Such searches may be performed with search engines and network-based commerce systems. With the proliferation of websites for conveying a large volume of information to users, a challenge may exist for users to readily and concisely peruse the vast amount of information available in search results related to website navigation.

A user may desire to quickly assess the success of search results in matching their needs and expectations for information. To accomplish this assessment a user may desire to expand or contract an amount of information and related details being displayed as a result of an online search. A user's being able to readily display more or fewer details in item listings may allow a more efficient way of determining a match of particular search results with the information desired or whether a further search may be needed.

A convenient and easy to use interface with a client device may allow the user to quickly elaborate or reduce the amount of detail and refinement of display data, thus offering a quick way of perusing search results. A user may also desire to expand or contract the amount of data being displayed for a particular aspect of the results in an item listing. For example, a user may want to examine older or newer reviews of movies found in an online search for entertainment.

BRIEF DESCRIPTION OF DRAWINGS

Some embodiments are illustrated by way of example and not limitation in the figures of the accompanying drawings in which:

FIGS. 5A, 5B, 6A, and 6B are diagrammatic representations of a pinch-out gesture performed slowly and rapidly respectively, according to an example embodiment;

FIGS. 11A, 11B, 12A, and 12B are diagrammatic representations of a pinch-in gesture performed with a small magnitude gesture and a large magnitude gesture respectively, according to an example embodiment;

FIGS. 13A, 13B, 14A, and 14B are diagrammatic representations of pinch-out gestures relating to two particular aspects of display data respectively, according to an example embodiment;

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Environment

A device with a touch-enabled screen may be configured to accept a user's interaction with the touch screen to control display of the results of online searches for information and ecommerce listings. A user's interaction with a touch screen of the device with multipoint pinch gestures may facilitate navigation through large volumes of data, generally, and in some embodiments, search results. Touch-enabled navigation with pinch gestures to elaborate or contract the results of a given search may present a more definitive view of those results or present a better indication of the requirement for a further search by the user.

Figure 1:
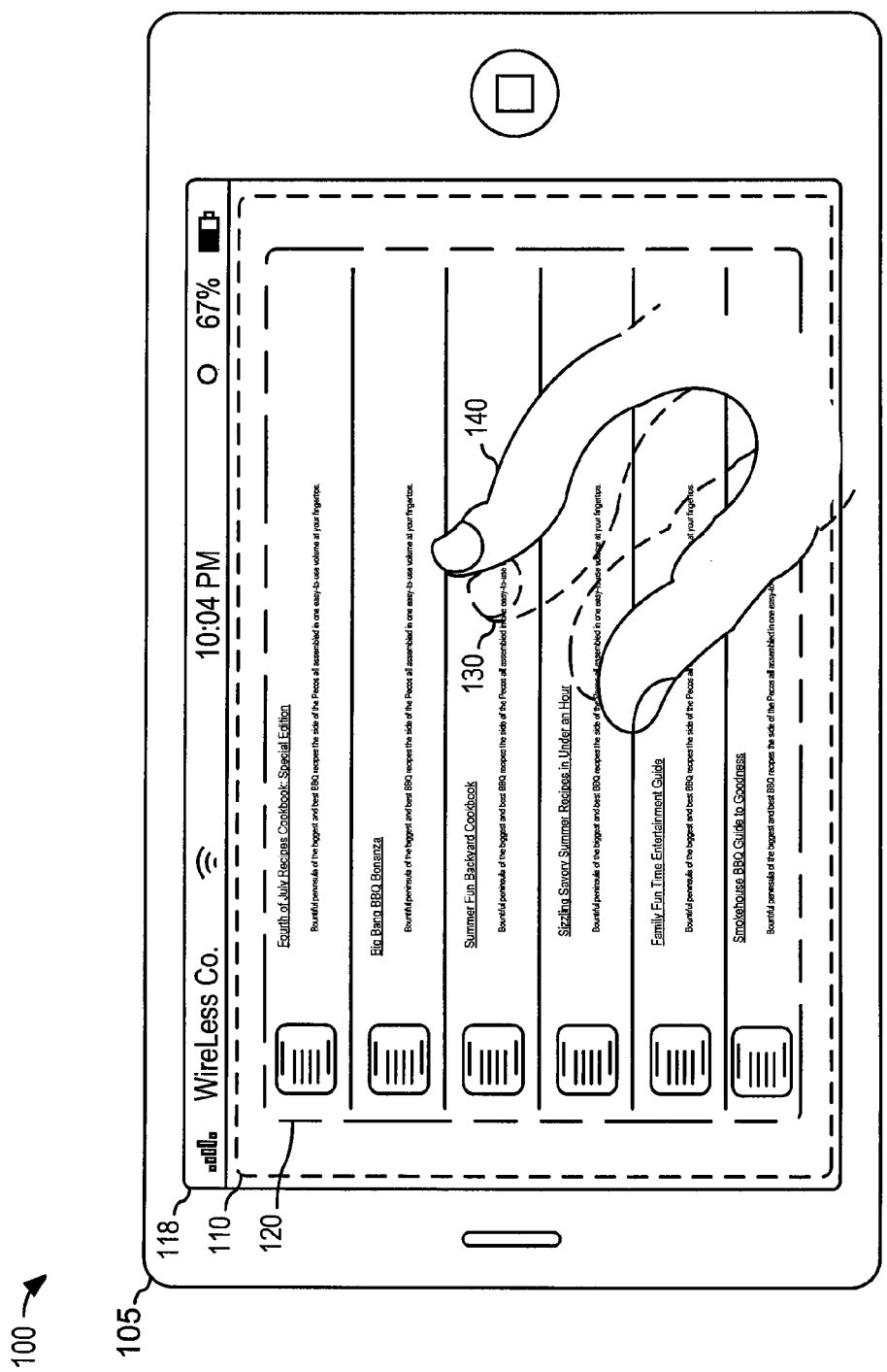
FIG. 1 is an illustration of a client device displaying search results, according town example embodiment.

FIG. 1 depicts a search results control system 100 embodied, for example, as a mobile device 105, such as a cell phone, engaged in an online commerce session as a client device. The search results control system 100 may incorporate a touch-enabled screen 110 transparently overlaying at least a portion of a display 118. The display 118 may provide images of a listing 120 of item data, for example, and the touch screen 110 may facilitate user interaction with the listing 120 and control of further search results through multipoint touch gestures (described below). The search results control system 100 may also be embodied as a personal data assistant, an electronic tablet, or a notebook computer (not shown), for example. The search results control system 100 may further be embodied with a desktop (not shown), deskside computer system (not shown), or terminal (not shown), for example.

Contact with the touch-enabled screen 110 by a user may define a touch point. Touch points may be produced by finger tips (e.g., the tip of a thumb or a forefinger) or by any implement capable of registering contact with the touch-enabled screen 110. Gestures may be considered as a movement of one or more touch points across the touch-enabled screen 110 performed so as to register a control input to the mobile device 105. Two-fingered gestures may be known as multipoint touch gestures or multipoint gestures and may be produced by a transition of two fingers from a first position to a second position, for example. In one example embodiment of a multipoint gesture, the thumb and forefinger of a hand are shown moving from a slightly open position 130 to a slightly closed position 140.

Multipoint gestures may be pinch gestures which may be characterized by two touch points being moved in relative coordination with one another. For example, a pinch-in gesture may be characterized by a first touch point and a second touch point coming closer together and a pinch-out gesture may be characterized by the first touch point and the second touch point becoming further apart. By placing the tips of two or more fingers on the touch-enabled screen 110, a user of the mobile device 105 may enter multipoint gestures which may be configured, for example, to impart certain control input information to operations performed by the mobile device 105.

In some embodiments, pinch gestures are used in a commerce context or a general information search situation. In other embodiments, pinch gestures may be used in an operating system context. In example embodiments, pinch gestures are used to trigger the generation of further refined search result details through elaboration or less refined search result details through contraction. The elaboration and contraction may be known as information scaling processes. A pinch-in gesture contracts (reduces elaboration) and a pinch-out gesture expands on (elaborates) search results through corresponding scaling process on search results. The pinch-in gesture and the pinch-out gesture may be thought of as controlling aspects of refinement in displayed data and may control various different aspects of refinement of data according to the orientation by which they are applied.

Product searches on e-commerce sites, such as eBay®, may produce item listings of products presented as an array or grid of detailed pictures, thumbnail pictures, or symbolic image data accompanied by a respective amount of text data describing the accompanying image data. The pinch-out gesture may be used, for example, to focus on fewer thumbnails or images but to have more metadata displayed per product item. The pinch-out gesture may also produce a further refined thumbnail or more detailed picture of the image data portion of a listing item at the same time the further metadata is displayed. In contrast, the pinch-in gesture may be used to produce a display of more thumbnails with each thumbnail having less metadata information displayed. Correspondingly, the pinch-in gesture may also produce less refined thumbnails yet produce more of them for a given abstraction level of display. Application of the pinch-in and pinch-out gestures with a varying magnitude and proportional speed may produce corresponding amounts of contraction and elaboration respectively of search results and listings. Additionally, multipoint pinch gestures may be used in combination with panning and scrolling gestures to provide a complementary set of tools for a user to navigate various aspects and levels of abstraction in search results.

The search results control system 100 may be embodied, for example, as a tablet, deskside or desktop computer system with a touch-enabled screen overlaying a display (not shown) that may provide similar capabilities to the mobile device 105 described above. The mobile device 105, the tablet computer system, the deskside computer system, or desktop computer system may, for example, also display results corresponding to a general search of the web with a search engine where the listing 120 depicts an array of item data that may be navigated with multipoint pinch gestures.

System

Figure 2:
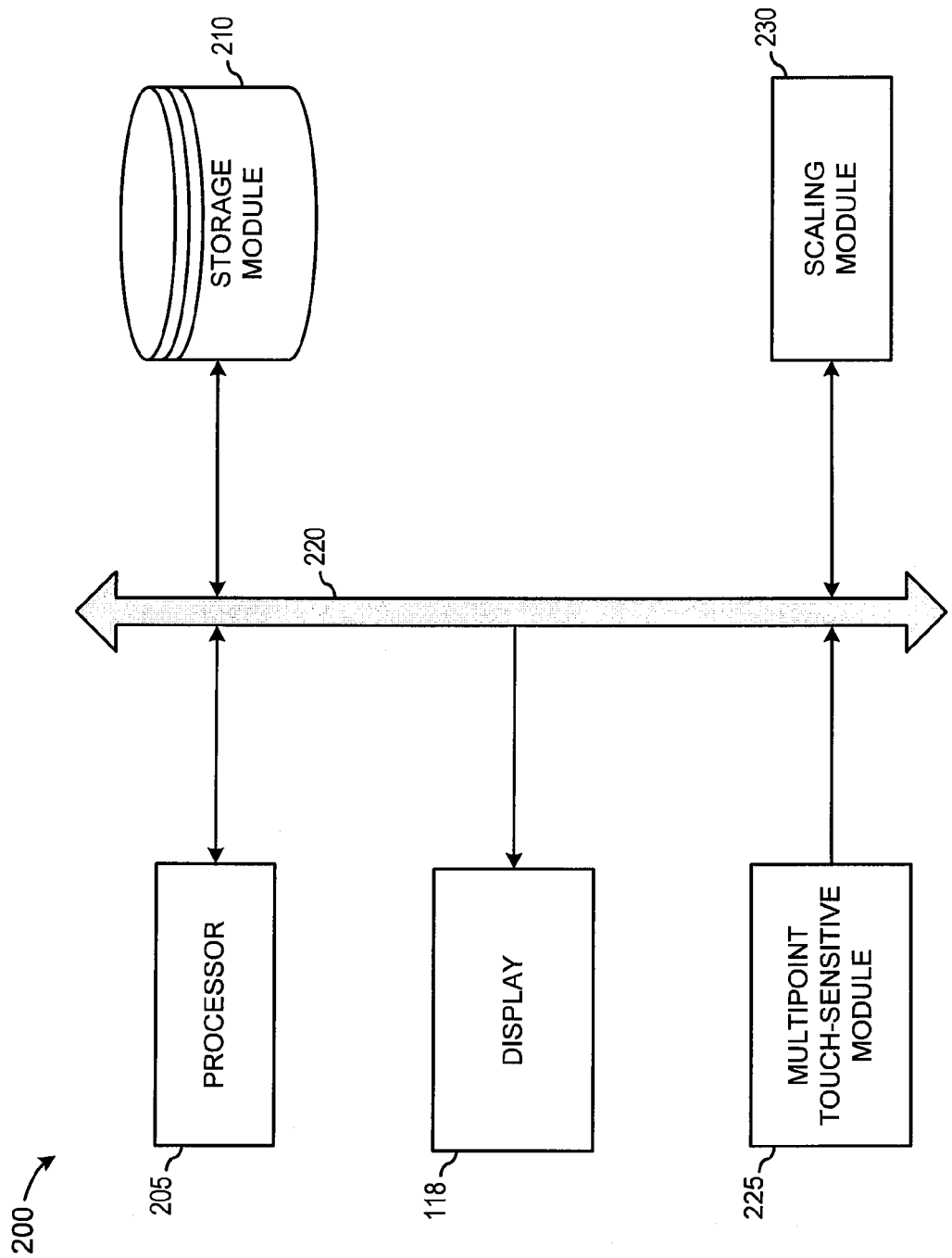
FIG. 2 is a block diagram of a search results control system, as may be used in an example embodiment.

FIG. 2 depicts a block diagram with data flow connections between modules of the search results control system 100 according to an example embodiment. The control system 100 may include a processor 205, a storage module 210, and the display 118, each communicatively coupled to a bus 220. The control system 100 may also include a multipoint touch-sensitive module 225, and a scaling module 230, each communicatively coupled to the bus 220.

The touch-enabled screen 110 may have touch point recognition and gesture determination facilitated by the multipoint touch-sensitive module 225 working in combination with the processor 205. The listing 120 may be scaled by the scaling module 230 interacting with the processor 205, where the particular degree of scaling is determined by receipt of controlling interactions with a user through multipoint gestures input through the touch-enabled screen 110 (FIG. 1) and processed with the multipoint touch-sensitive module 225. Control programming, that may be used to facilitate touch point recognition, gesture determination, and control of any of the modules described herein, may be executed on the processor 205, and stored in the storage module 210.

Interfaces

Figure 3A:
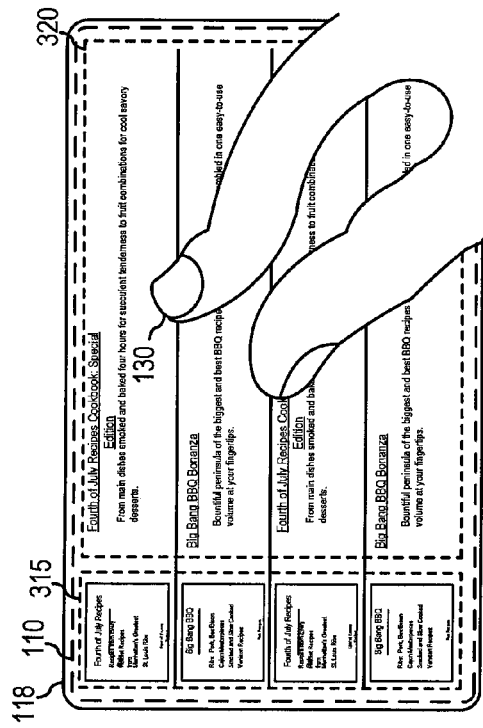

FIGS. 3A, 3B, 4A, and 4B are diagrammatic representations of pinch-out and pinch-in gestures respectively, according to one example embodiment. More particularly, FIG. 3A depicts an initial finger position just prior to a pinch-out gesture. This example embodiment of the pinch-out gesture commences with two fingers in a slightly open position 130 on the touch-enabled screen 110 (corresponding to the mobile device 105 in FIG. 1). The display 118 shows an image data region 315 and a metadata region 320 corresponding to a listing of item data as may be presented after an online search activity. The image data region 315 shows a stylized-level of image data (e.g., stylized representation of book covers or book title pages) and correspondingly, the metadata region 320 shows a phrase-level abstraction of descriptive metadata corresponding to a midrange-level of abstraction (reference the LISTING ABSTRACTION LEVELS TABLE below) of the online search results.

Figure 3B:
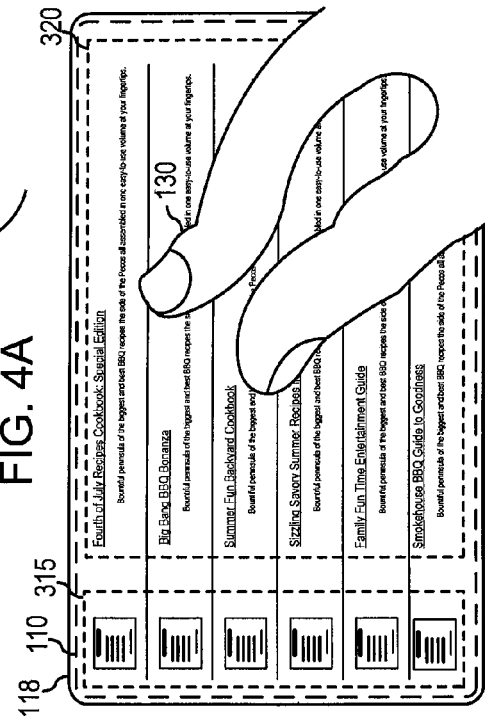

FIG. 3B shows a slightly closed position 140 of the fingers at the conclusion of a pinch-out gesture. The pinch-out gesture consists of the transition, for example, of the thumb and first finger from the slightly open position 130 (FIG. 3A) to the slightly closed position 140 on the touch-enabled screen 110. As a result of the pinch-out gesture, the image data region 315 shows a detailed-level abstraction of image data (elaborated or "scaled-in" from the stylized-level of image data in FIG. 3A) and the metadata region 320 shows a sentence-level abstraction of metadata (scaled-in from the phrase-level abstraction of metadata in FIG. 3A) corresponding to a detailed-level of abstraction (reference LISTING ABSTRACTION LEVELS TABLE below) of the online search results. In some embodiments, the number of search results displayed as a result of a pinch-out gesture may be less than the number of search results depicted prior to the pinch-out gesture (e.g., the example embodiment of FIG. 3A).

Figure 4A:
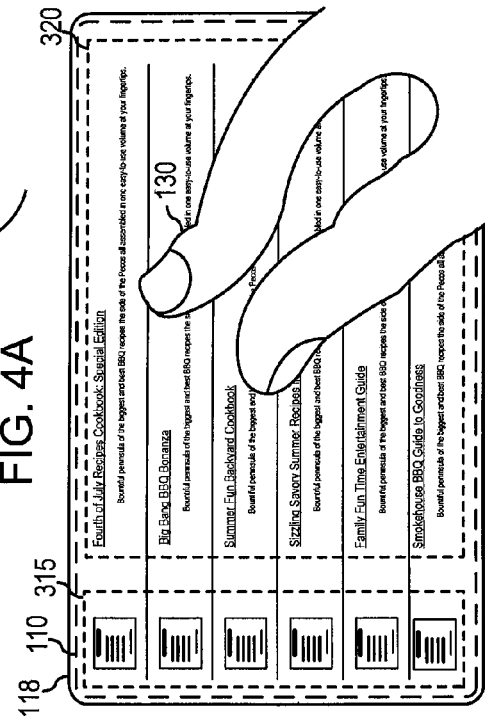
FIGS. 3A, 3B, 4A, and 4B are diagrammatic representations of a pinch-out and a pinch-in gesture respectively, according to an example embodiment.

FIG. 4A depicts an initial finger position just prior to a pinch-in gesture. This example embodiment of the pinch-in gesture commences with two fingers in the slightly closed position 140 on the touch-enabled screen 110. The image data region 315 shows a stylized-level abstraction of image data (as in FIG. 3A) and correspondingly, the metadata region 320 shows a phrase-level abstraction of metadata (as in FIG. 3A) corresponding to the midrange-level of abstraction of the online search results.

Figure 4B:
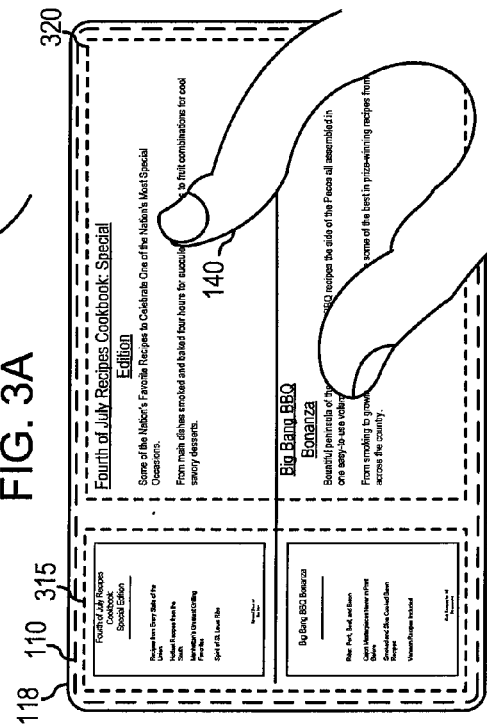

FIG. 4B shows the slightly open position 130 of the fingers at the conclusion of a pinch-in gesture. The pinch-in gesture consists of the transition, for example, of the thumb and first finger from the slightly closed position 140 (FIG. 4A) to the slightly open position 130 on the touch-enabled screen 110. As a result of the pinch-in gesture, the image data region 315 shows a characterized-level abstraction of image data (condensed from the stylized-level abstraction of image data in FIG. 4A) and the metadata region 320 shows a word-level abstraction of metadata (condensed from the phrase-level abstraction of metadata in FIG. 4A) corresponding to the brief-level of abstraction (reference LISTING ABSTRACTION LEVELS TABLE below) of the online search results.

As one skilled in the art will readily appreciate, the initial finger position and the finger position at the conclusion of the pinch gesture may vary in the magnitude of separation. Yet, the same gesture may have been performed even though transitions from initial finger positions to concluding finger positions may vary from one example embodiment to another. The skilled artisan would further appreciate that the representation levels of the image data and the metadata may vary considerably from one level of abstraction to another due to information scaling processes. Similarly, the skilled artisan would additionally appreciate that application of pinch gestures to one abstraction level may cause a transition in the display of item data spanning more than one listing abstraction level depending on a magnitude and a velocity of the application of the pinch gesture. For the purposes of the detail descriptions herein, a delineation of gesture finger positions and abstraction levels of exemplary listing metadata are presented in the tables below.

Tables

| GESTURE FINGER POSITIONS | |
|---|---|
| Finger Position: | Figure Element Example: |
| closed | 510 |
| slightly open | 130 |
| midrange | 530 |
| slightly closed | 140 |
| open | 520 |

| LISTING ABSTRACTION LEVELS of IMAGE DATA and METADATA | | | | |
|---|---|---|---|---|
| Listing Abstraction Level | Image Data Level | Metadata Level | Relative Scaling | Relative Pinch Gesture |
| Subject: | Symbolic | Heading | Scaled-out | Pinched-in |
| Brief: | Characterized | Word | . | . |
| Midrange: | Stylized | Phrase | . | . |
| Detailed: | Detailed | Sentence | . | . |
| Elaborated: | Photographic | Paragraph | Scaled-in | Pinched-out |

The LISTING ABSTRACTION LEVELS of IMAGE DATA and METADATA table above depicts successive levels of abstraction of listing data from most condensed (subject-level) to the most refined (elaborated-level). The levels of abstraction, the corresponding levels of image data and metadata, as well as the number of levels, and naming conventions correspond to a particular example embodiment. Other listings of items may vary in subject matter, number of levels of abstraction, and terminology. The intermediate abstraction levels, progressing from subject-level to elaborated-level, correspond to increasing refinement of image data and metadata. For example, progressing from the brief-level of abstraction to the midrange-level, the metadata progresses from a word-level (depictions in a word or a few select words) to a phrase-level (depictions in snippets or small portions of sentences).

The subject-level of abstraction for listing data depicts a symbolic-level of abstraction of image data and a heading-level of abstraction of metadata. Each of these respective representations depicts one of the least amounts of information in a relatively condensed or truncated presentation of item data. For example, symbolic-level of abstraction of image data may be depicted with a simple symbol or line drawing of an outline of a book. The heading-level of abstraction of metadata may be depicted by the title or a portion of the title of the book. In reference to a further condensed abstraction level (not shown) beyond the subject-level of abstraction, the symbolic-level of image data and the heading-level of metadata may be further condensed (in the further condensed abstraction level) to a bullet point and simple subject (e.g., a simple representative word) respectively.

In the brief-level of abstraction, the characterized-level of image data and the word-level of meta-data depict representations of item data one level more refined (detailed) than the respective representations at the subject-level of abstraction. The characterized-level of image data may be an artist's characterization of essential features of a more detailed reference image taken as an indicator of pertinent features, for example. The word-level of meta-data may be a selection of a few words or key words that most characteristically capture the metadata corresponding to the listing item.

The midrange-level of abstraction includes the stylized-level of image data and the phrase-level of metadata representation which depict item data one level further refined than the respective representations at the brief-level of abstraction. The stylized-level of image data may be composed of images implemented with artistic forms and conventions to create appropriate effects for a compact representation of image data. The phrase-level of meta-data may be a select phrase that most concisely captures the metadata corresponding to the listing item.

In the detailed-level of abstraction the image data and metadata representations of item data are depicted at the detailed-level and the sentence-level respectively. The detailed-level of image data may be depicted as thumbnail images or condensed representations of a photographic image. The sentence-level of metadata may be a selection of sentences representative of a more elaborate textual description of listing items.

At the elaborated-level of abstraction, image data is depicted at a photographic level (visual data with refinement corresponding to a picture or photograph) and the associated metadata may include complete paragraphs of textual description. The elaborated-level of abstraction represents the most complete and most highly refined representation of image data and metadata corresponding to, for example, the listing items displayed resulting from a search or query.

FIGS. 5-8 detail velocity-related pinch gesture characteristics and the ensuing item listing results. For instance, the speed of a gesture determines the degree of scaling (elaboration/contraction) of listing results. A faster pinch velocity for the same range (magnitude) of a pinch gesture produces greater scaling of results compared to a slower speed pinch gesture.

FIG. 5A depicts an initial finger position just prior to a low velocity pinch-out gesture. This example embodiment of the pinch-out gesture commences with two fingers in a closed position 510 on the touch-enabled screen 110. The image data region 315 shows a stylized-level abstraction of image data (as in FIG. 3A) and correspondingly, the metadata region 320 shows a phrase-level abstraction of metadata corresponding to the midrange-level of abstraction of item listings for online search results.

FIG. 5B shows an open position 520 of the fingers at the conclusion of the low velocity pinch-out gesture. The low velocity pinch-out gesture consists of a low velocity transition, for example, of the thumb and first finger from the closed position 510 (FIG. 5A) through the slightly open position 130, a midrange position 530, and the slightly closed position 140, to the open position 520 on the touch-enabled screen 110 in a certain period of time. As a result of the low velocity pinch-out gesture, the image data region 315 shows a detailed-level abstraction of image data (elaborated from the stylized-level abstraction of image data in FIG. 5A) and the metadata region 320 shows a sentence-level abstraction of metadata (elaborated from the phrase-level abstraction of metadata in FIG. 5A) corresponding to the detailed-level of abstraction of online search results.

FIG. 6A depicts an initial finger position just prior to a high velocity pinch-out gesture. This example embodiment of the pinch-out gesture commences with two fingers in the closed position 510 on the touch-enabled screen 110. The image data region 315 shows a stylized-level abstraction of image data (as in FIG. 5A) and correspondingly, the metadata region 320 shows a phrase-level abstraction of metadata corresponding to the midrange-level of abstraction of online search results.

FIG. 6B shows the open position 520 of the fingers at the conclusion of the high velocity pinch-out gesture. The high velocity pinch-out gesture consists of the high velocity transition, for example, of the thumb and first finger from the closed position 510 (FIG. 6A), through the midrange position 530, to the open position 520 on the touch-enabled screen 110. The transition takes place, for example, in a period of time less than the transition of the fingers from the closed position 510 to the midrange position 530 as transpiring in the transition of FIGS. 5A-5B. In some embodiments, the time for a high velocity pinch-out gesture may be on the order of half of the amount of time for the low velocity pinch-out gesture. As a result of the high velocity pinch-out gesture, the image data region 315 shows a photographic-level abstraction of image data (elaborated from the stylized-level abstraction of image data in FIG. 6A) and the metadata region 320 shows a paragraph-level abstraction of metadata (elaborated from the phrase-level abstraction of metadata in FIG. 6A) corresponding to the elaborated-level of abstraction (reference LISTING ABSTRACTION LEVELS TABLE above) of online search results.

Figure 7A:
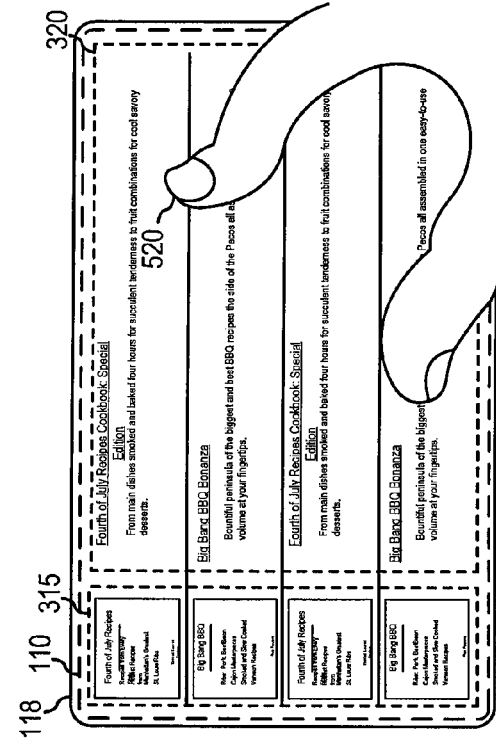
FIGS. 7A, 7B, 8A, and 8B are diagrammatic representations of a pinch-in gesture performed slowly and rapidly respectively, according to an example embodiment.

FIG. 7A depicts an initial finger position just prior to a low velocity pinch-in gesture. This example embodiment of the pinch-in gesture commences with two fingers in an open position 520 on the touch-enabled screen 110. The image data region 315 shows a stylized-level abstraction of image data (as in FIG. 5A) and correspondingly, the metadata region 320 shows a phrase-level abstraction of metadata corresponding to the midrange-level of abstraction of online search results.

Figure 7B:
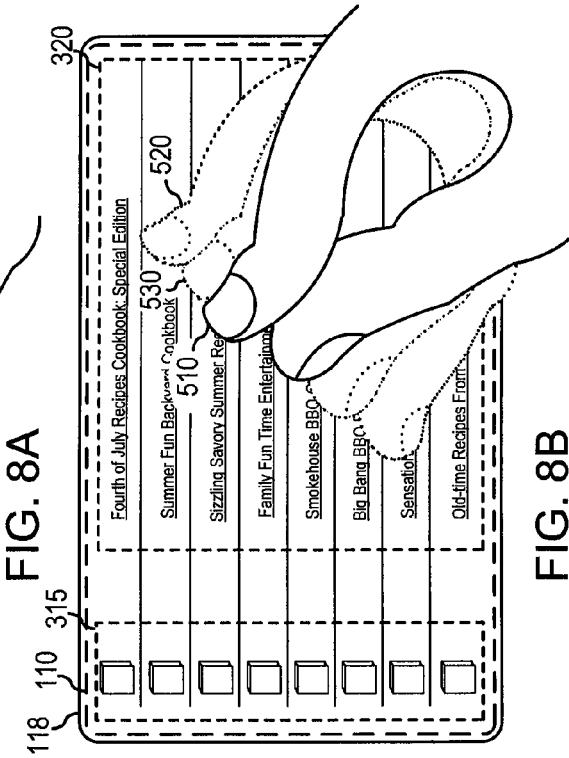

FIG. 7B shows the closed position 510 of the fingers at the conclusion of the low velocity pinch-in gesture. The low velocity pinch-in gesture consists of a low velocity transition, for example, of the thumb and first finger from the open position 520 (FIG. 7A) through the slightly closed position 140, the midrange position 530, and the slightly open position 130, to the closed position 510 on the touch-enabled screen 110 in a certain period of time. As a result of the low velocity pinch-in gesture, the image data region 315 shows a characterized-level abstraction of image data (condensed from the stylized-level abstraction of image data in FIG. 7A) and the metadata region 320 shows a word-level abstraction of metadata (condensed from the phrase-level abstraction of metadata in FIG. 7A) corresponding to the brief-level of abstraction of online search results.

Figure 8A:
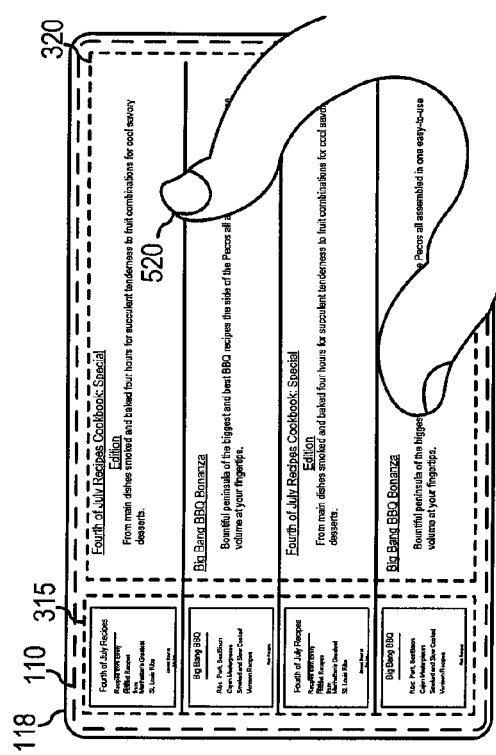

FIG. 8A depicts an initial finger position just prior to a high velocity pinch-in gesture. This example embodiment of the pinch-in gesture commences with two fingers in the open position 520 on the touch-enabled screen 110. The image data region 315 shows a stylized-level abstraction of image data (as in FIG. 7A) and correspondingly, the metadata region 320 shows a phrase-level abstraction of metadata corresponding to the midrange-level of abstraction of online search results.

Figure 8B:
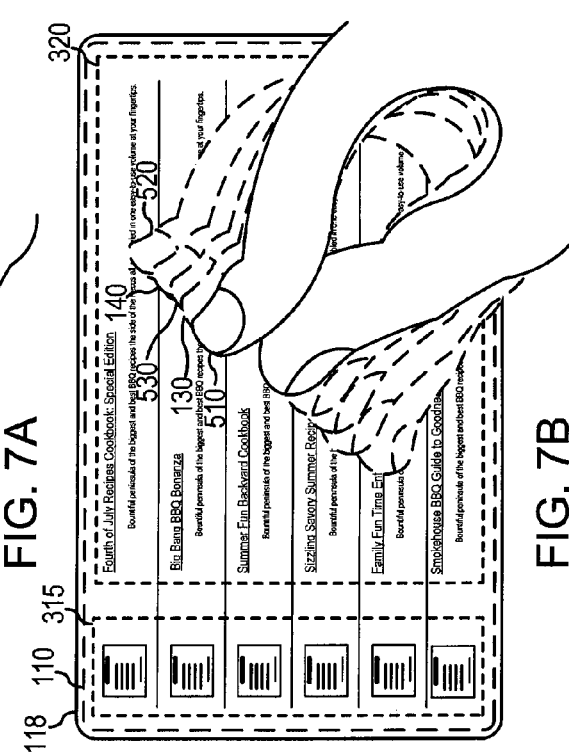

FIG. 8B shows the closed position 510 of the fingers at the conclusion of the high velocity pinch-in gesture. The high velocity pinch-in gesture consists of the high velocity transition, for example, of the thumb and first finger from the open position 520 (FIG. 8A), through the midrange position 530, to the closed position 510 on the touch-enabled screen 110. The transition takes place, for example, in a period of time less than the transition of the fingers from the open position 520 to the midrange position 530 as transpiring in the transition of FIGS. 7A-7B. In some embodiments, the time for a high velocity pinch-in gesture may be on the order of half of the amount of time for the low velocity pinch-in gesture. As a result of the high velocity pinch-in gesture, the image data region 315 shows a symbolic-level abstraction of image data (condensed from the stylized-level abstraction of image data in FIG. 8A) and the metadata region 320 shows a heading-level abstraction of metadata (condensed from the phrase-level abstraction of metadata in FIG. 8A) corresponding to the subject-level of abstraction (reference LISTING ABSTRACTION LEVELS TABLE above) of online search results.

FIGS. 9-12 detail magnitude-related pinch gesture characteristics and the ensuing item listing results. For instance, the magnitude of a gesture determines the degree of scaling (elaboration/contraction) of listing results. A larger pinch range or magnitude for the same velocity of a pinch gesture produces greater scaling of results compared to a smaller range pinch gesture.

Figure 9A:
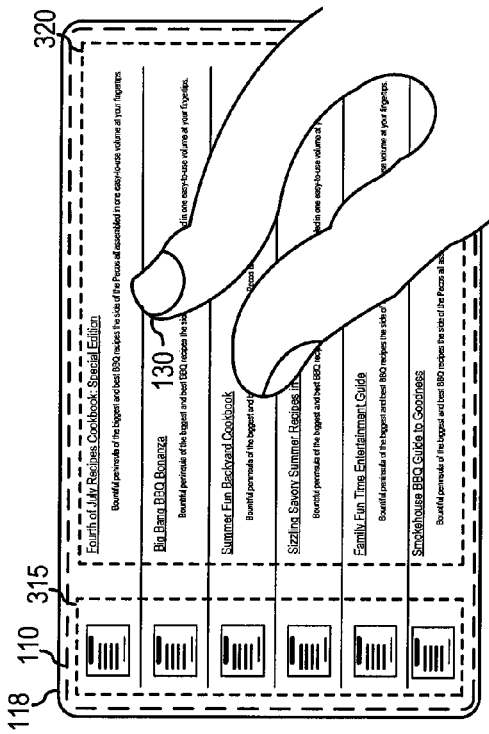

FIG. 9A depicts an initial finger position just prior to a small magnitude pinch-out gesture. This example embodiment of the pinch-out gesture commences with two fingers in the slightly open position 130 on the touch-enabled screen 110. The image data region 315 shows a characterized-level abstraction of image data and correspondingly, the metadata region 320 shows a word-level abstraction of metadata corresponding to the brief-level of abstraction of online search results.

Figure 9B:
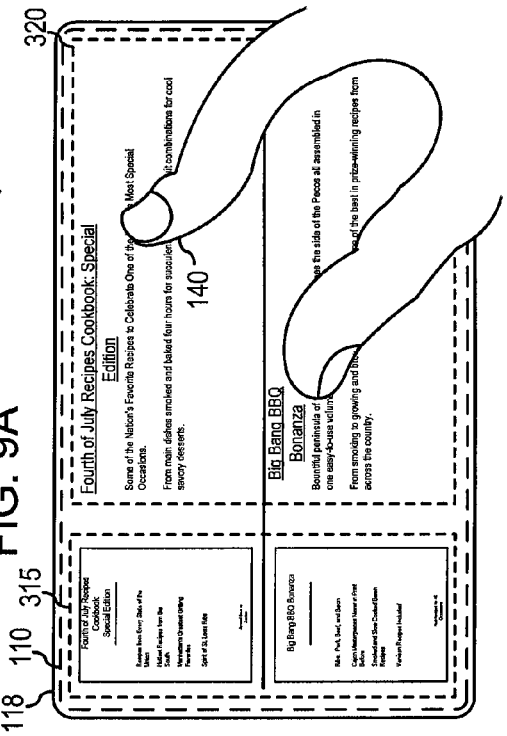

FIG. 9B shows the slightly closed position 140 of the fingers at the conclusion of the small magnitude pinch-out gesture. The small magnitude pinch-out gesture consists of a small magnitude transition, for example, of the thumb and first finger from the slightly open position 130 (FIG. 9A) to the slightly closed position 140 on the touch-enabled screen 110 in a certain period of time. As a result of the small magnitude pinch-out gesture, the image data region 315 shows a detailed-level abstraction of image data (elaborated from the characterized-level abstraction of image data in FIG. 9A) and the metadata region 320 shows a sentence-level abstraction of metadata (elaborated from the word-level abstraction of metadata in FIG. 9A) corresponding to the detailed-level of abstraction of online search results.

Figure 10A:
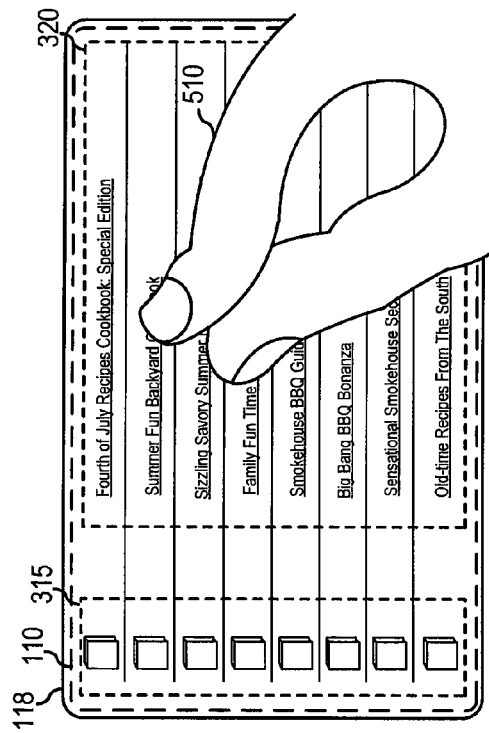
FIGS. 9A, 9B, 10A, and 10B are diagrammatic representations of a pinch-out gesture performed with a small magnitude gesture and a large magnitude gesture respectively, according to an example embodiment.

FIG. 10A depicts an initial finger position just prior to a large magnitude pinch-out gesture. This example embodiment of the pinch-out gesture commences with two fingers in the closed position 510 on the touch-enabled screen 110. The image data region 315 shows a symbolic-level abstraction of image data and correspondingly, the metadata region 320 shows a heading-level abstraction of metadata corresponding to the subject-level of abstraction of online search results.

Figure 10B:
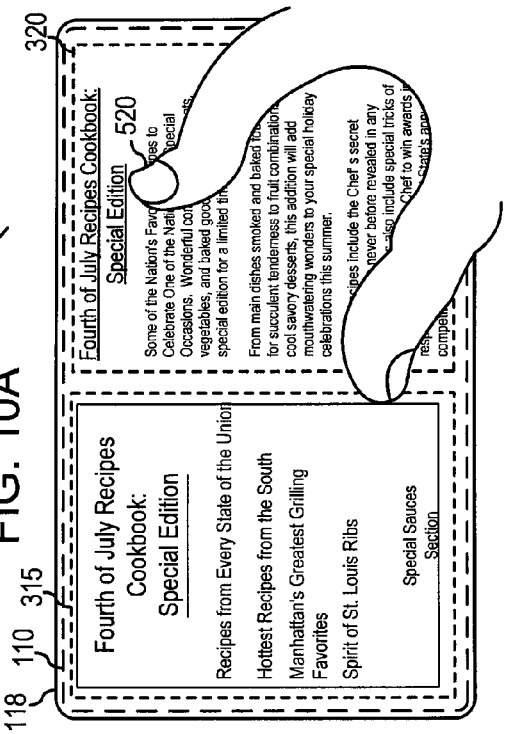

FIG. 10B shows the open position 520 of the fingers at the conclusion of the large magnitude pinch-out gesture. The large magnitude pinch-out gesture consists of the large magnitude transition, for example, of the thumb and first finger from the closed position 510 (FIG. 10A) to the open position 520 on the touch-enabled screen 110. The transition takes place, for example, in a period of time about the same as the transition of the fingers from the slightly open position 130 to the slightly closed position 140 transpiring in the transition of FIGS. 9A-9B (i.e., transpiring with about the same velocity). As a result of the large magnitude pinch-out gesture, the image data region 315 shows a photographic-level abstraction of image data (elaborated from the symbolic-level abstraction of image data in FIG. 10A) and the metadata region 320 shows a paragraph-level of abstraction of metadata (elaborated from the heading-level abstraction of metadata in FIG. 10A) corresponding to the subject-level of abstraction of online search results.

FIG. 11A depicts an initial finger position just prior to a small magnitude pinch-in gesture. This example embodiment of the pinch-in gesture commences with two fingers in the slightly closed position 140 on the touch-enabled screen 110. The image data region 315 shows a detailed-level abstraction of image data and correspondingly, the metadata region 320 shows a sentence-level abstraction of metadata corresponding to the detailed-level of abstraction of online search results.

FIG. 11B shows the slightly open position 130 of the fingers at the conclusion of the small magnitude pinch-in gesture. The small magnitude pinch-in gesture consists of a small magnitude transition, for example, of the thumb and first finger from the slightly closed position 140 (FIG. 11A) to the slightly open position 130 on the touch-enabled screen 110 in a certain period of time. As a result of the small magnitude pinch-in gesture, the image data region 315 shows a characterized-level abstraction of image data (condensed from the detailed-level abstraction of image data in FIG. 11A) and the metadata region 320 shows a word-level abstraction of metadata (condensed from the sentence-level abstraction of metadata in FIG. 11A) corresponding to the brief-level of abstraction of online search results.

FIG. 12A depicts an initial finger position just prior to a large magnitude pinch-in gesture. This example embodiment of the pinch-in gesture commences with two fingers in the open position 520 on the touch-enabled screen 110. The image data region 315 shows a photographic-level abstraction of image data and correspondingly, the metadata region 320 shows a paragraph-level abstraction of metadata corresponding to the elaborated-level of abstraction of online search results.

FIG. 12B shows the closed position 510 of the fingers at the conclusion of the large magnitude pinch-in gesture. The large magnitude pinch-in gesture consists of the large magnitude transition, for example, of the thumb and first finger from the open position 520 (FIG. 12A) to the closed position 510 on the touch-enabled screen 110. The transition takes place, for example, in a period of time about the same as the transition of the fingers from the slightly closed position 140 to the slightly open position 130 as transpiring in the transition of FIGS. 11A-11B (i.e., transpiring with about the same velocity). As a result of the large magnitude pinch-in gesture, the image data region 315 shows a symbolic-level abstraction of image data (condensed from the photographic-level abstraction of image data in FIG. 12A) and the metadata region 320 shows a heading-level abstraction of metadata (condensed from the paragraph-level abstraction of metadata in FIG. 12A) corresponding to the subject-level of abstraction of online search results.

FIGS. 13-16 depict pinch gestures producing display listings based on a certain portion of the display 118 and a certain aspect of listing data associated with the execution of the gestures.

FIG. 13A, for example, shows an indication of a single touch gesture 1310 being applied directly above and corresponding to a particular aspect of the item data for the listing of items. The single touch gesture 1310 may be performed directly above the image data region 315 which may show the characterized-level abstraction of image data.

In FIG. 13B, the pinch-out gesture is applied in the image data region 315 subsequent to application of the single touch gesture 1310 there. The ensuing locations of application of the fingers to the touch-enabled screen 110 in performing the pinch-out gesture, may transition along a vertical dimension of the display 118 from the slightly open position 130 to the open position 520 over the image data region 315. The pinch-out gesture may result in an elaboration of the contents of the image data region 315 and may correspondingly show a detailed-level abstraction of image data elaborated from the characterized-level abstraction of image data. In this example, the display of metadata in the metadata region 320 is not altered by application of the pinch-out gesture in the image data region 315. The pinch-out gesture may be applied within a range of fifteen to thirty degrees of a vertical axis of the display 118 to be recognized as having been applied to a particular display region.

By way of further example, the contents of the image data region 315 in FIG. 13A may be contracted in correspondence with the application of the pinch-in gesture (not shown) to the corresponding particular portion of the touch-enabled screen 110. Application of the pinch-in gesture on the image data region 315 may cause the symbolic-level abstraction of image data to be produced in this region as a contraction of the initial characterized-level abstraction of image data. In this example, the display of metadata in the metadata region 320 is not altered by application of the pinch-in gesture in the image data region 315. Thus, application of the pinch-out/in gestures to certain portions of the display 118 may cause corresponding elaboration/contraction of image data contents of the image data region 315 only.

FIG. 14A, for example, shows a further indication of the single touch gesture 1310 directly above and corresponding to a further aspect of the item data for the listing of items. The further indication of the single touch gesture 1310 may be performed directly above the metadata region 320 which may show the word-level abstraction of metadata.

In FIG. 14B, the pinch-out gesture is applied in the metadata region 320 subsequent to application of the single touch gesture 1310 there. The ensuing locations of application of the fingers to the touch-enabled screen 110 in performing the pinch-out gesture, may transition in a vertical dimension of the display 118 from the slightly open position 130 to the open position 520 over the metadata region 320. The pinch-out gesture may result in an elaboration of the contents of the metadata region 320 and may correspondingly show the sentence-level abstraction of metadata elaborated from the word-level abstraction of metadata. In this example, the display of image data in the image data region 315 is not altered by application of the pinch-out gesture in the metadata region 320. The pinch-out gesture may be applied within a range of fifteen to thirty degrees of the vertical axis of the display 118 to be recognized as having been applied to a particular display region.

By way of further example, the contents of the metadata region 320 in FIG. 14A may be contracted in correspondence with the application of the pinch-in gesture (not shown) to the corresponding particular portion of the touch-enabled screen 110. Application of the pinch-in gesture on the metadata region 320 may cause the heading-level abstraction of metadata to be produced in this region as a contraction of the initial word-level abstraction of metadata. In this example, the display of image data in the image data region 315 is not altered by application of the pinch-in gesture in the metadata region 320. Thus, application of the pinch-out/in gestures to certain portions of the display 118 may cause corresponding elaboration/contraction of metadata contents of the metadata region 320 only.

Figure 15A:
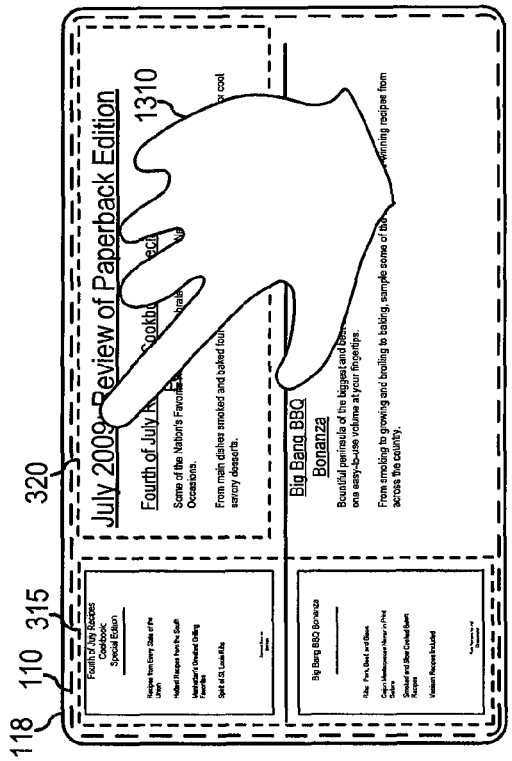
FIGS. 15A, 15B, 16A, and 16B are diagrammatic representations of a pinch-out gesture and a pinch-in gesture relating to a particular facet, of a particular aspect of display data, according to an example embodiment.

FIG. 15A, for example, shows an indication of the single touch gesture 1310 being applied directly above and corresponding to a particular facet of the particular aspect of the item data in the metadata region 320. In particular, the single touch gesture 1310 may be applied directly above the facet of the aspect of item data corresponding to a date, for example, of the item data. The particular aspect of the item data may be the metadata and the particular facet of this aspect may be the date of the metadata corresponding to the item data in the metadata region 320.

Figure 15B:
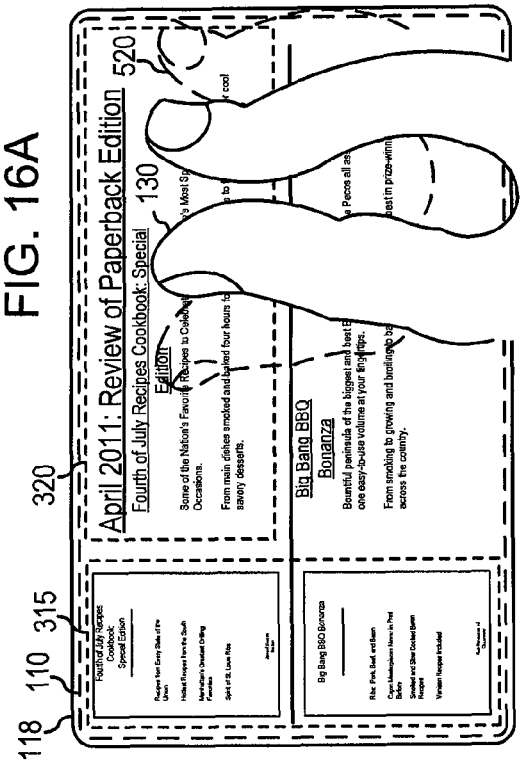

In FIG. 15B, a subsequent application of the pinch-out gesture in the metadata region 320, where the ensuing locations of application of the fingers to the touch-enabled screen 110 may transition in a horizontal dimension of the display 118 from the slightly open position 130 to the open position 520. The horizontal application of the pinch-out gesture may result in an elaboration of the date facet of the metadata aspect of the item data. The metadata region 320 may correspondingly show a further elaboration of the metadata spanning backward in time from an initial temporal indicator to a prior temporal indicator within the sentence-level abstraction. For example, the initial temporal indicator may be July 2009 and the prior temporal indicator may be May 2008 subsequent to the horizontal application of the pinch-out gesture. In this example, the display of image data in the image data region 315 is not altered by application of the pinch-out gesture in the metadata region 320. The pinch-out gesture may be applied within a range of fifteen to thirty degrees of a horizontal axis of the display 118.

Figure 16A:
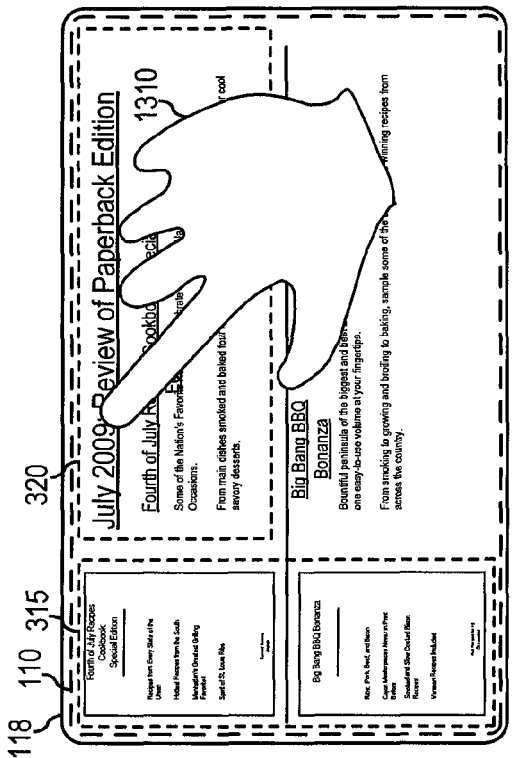

FIG. 16A shows a further indication of the single touch gesture 1310, for example, directly above and corresponding to the same facet of the further aspect of the item data as in the above described situation in FIG. 15A.

Figure 16B:
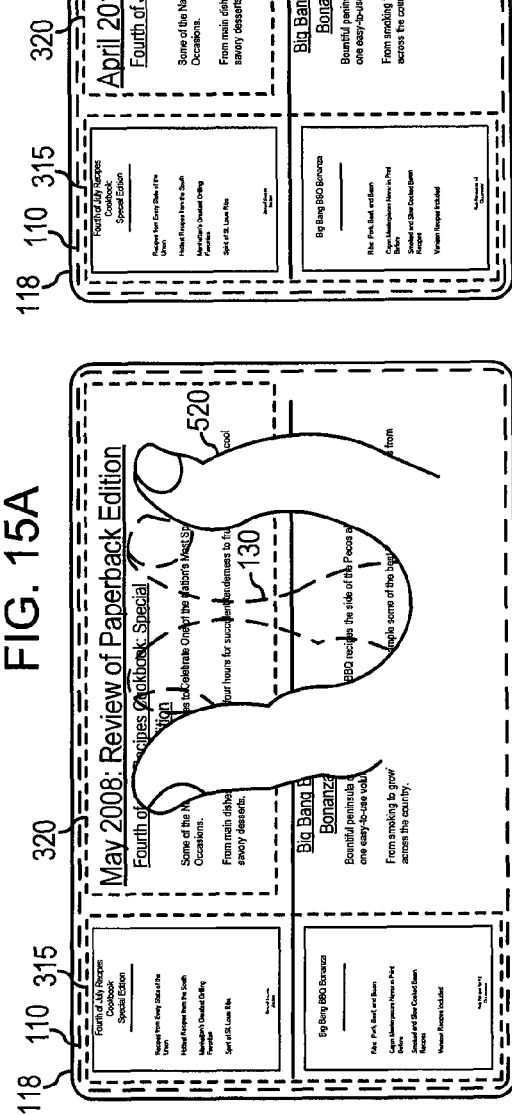

In FIG. 16B, subsequent to application of the pinch-in gesture (as opposed to the pinch-out gesture in FIG. 15B) in the metadata region 320, where the ensuing locations of application of the fingers to the touch-enabled screen 110 may transition in about a horizontal dimension of the display 118 from the open position 520 to the slightly open position 130. Application of the pinch-in gesture may result in an elaboration of the date facet of the further aspect of the metadata complementary to that of FIG. 15B. Subsequent to application of the pinch-in gesture, the metadata region 320 may show a further elaboration of the metadata spanning forward in time from an initial temporal indicator to a later temporal indicator within the sentence-level abstraction. For example, the initial temporal indicator may be July 2009 and the later temporal indicator may be April 2011 subsequent to the horizontal application of the pinch-in gesture. In this example, the display of image data in the image data region 315 is not altered by application of the pinch-in gesture in the metadata region 320. The pinch-in gesture may be applied within a range of fifteen to thirty degrees of the horizontal axis of the display 118.

Example Methods

Figure 17:
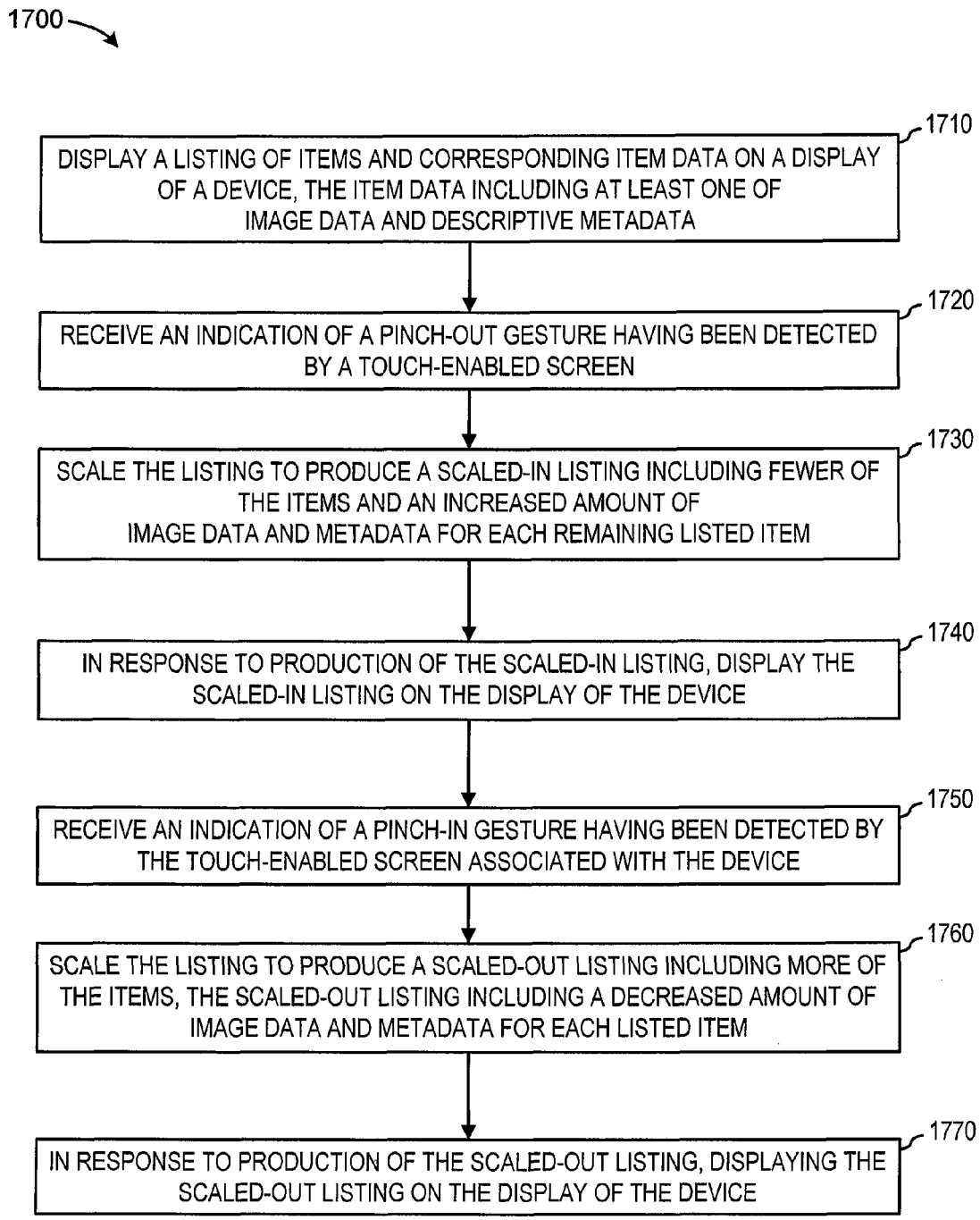
FIG. 17 is a flow chart illustrating a method to display a scaled-in listing and a scaled-out listing of item data, according to an example embodiment.

FIG. 17 depicts an example method of using a pinch-out and a pinch-in gesture (corresponding to FIGS. 3A,B and 4A,B respectively) to display a scaled-in listing and a scaled-out listing of item data 1700 respectively on the display 118 of a device. The device may correspond, for example, to the mobile device 105 as described in FIG. 1 above. The method commences at operation 1710 with causing a listing of items and corresponding item data to be displayed on the display 118 of the device. The item data includes, for each respective item, at least one of image data, displayed in the image data region 315, and descriptive metadata, displayed in the metadata region 320 of the display 118. The method continues with receiving 1720 an indication of a pinch-out gesture having been detected by the touch-enabled screen 110.

In response to the indication of the pinch-out gesture, the method proceeds with scaling 1730 the listing to produce a scaled-in listing including fewer of the listing items. The scaled-in listing also includes an increased amount of image data and metadata for each remaining listed item after the scaled-in process. In response to the production of the scaled-in listing, the method causes 1740 the scaled-in listing to be displayed on the display 118 of the device. The method progresses with receiving 1750 an indication of a pinch-in gesture having been detected by the touch-enabled screen 110 on the device.

The method continues, in response to the indication of the pinch-in gesture, by scaling 1760 the listing to produce a scaled-out listing including more of the items, the scaled-out listing also including a decreased amount of image data and metadata for each listed item. In response to the production of the scaled-out listing, that method causes 1770 the scaled-out listing to be displayed on the display 118 of the device. The method may be performed by the display 118, the multipoint touch-sensitive module 225, the scaling module 235, the processor 205, and storage module 210, or any further components and modules described herein.

Figure 18:
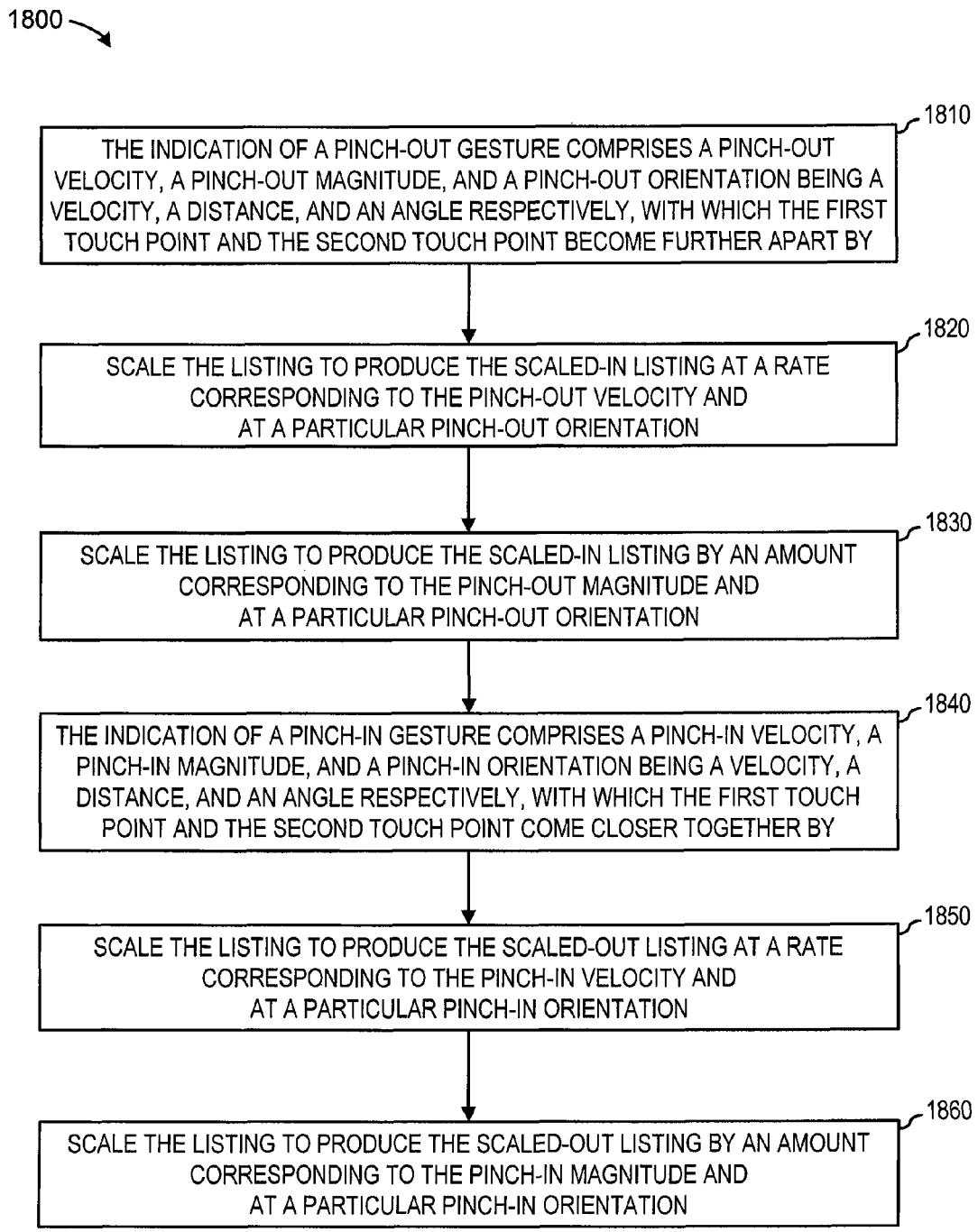
FIG. 18 is a flow chart illustrating a method to display a scaled-in listing and a scaled-out listing according to velocities and magnitudes of a pinch-out gesture and a pinch-in gesture respectively, according to an example embodiment.

FIG. 18 depicts an example method to display a scaled-in listing and a scaled-out listing according to velocities and magnitudes of a pinch-out gesture and a pinch-in gesture 1800 respectively. The method commences, where the indication 1810 of the pinch-out gesture includes a pinch-out velocity, a pinch-out magnitude, and a pinch-out orientation being a velocity, a distance, and an angle respectively, according to which the distance between the first touch point and the second touch point increases. The method continues with scaling 1820 the listing to produce the scaled-in listing at a rate corresponding to the pinch-out velocity (FIGS. 5A-B and 6A-B). The listing is scaled 1830 to produce the scaled-in listing by an amount corresponding to the pinch-out magnitude (FIGS. 9A-B and 10A-B), where each of the scaling processes may be indicated by a particular pinch-out orientation.

An indication 1840 of a pinch-in gesture includes a pinch-in velocity, a pinch-in magnitude, and a pinch-in orientation being a velocity, a distance, and an angle respectively, according to which the distance between the first touch point and the second touch point decreases. The method proceeds by scaling 1850 the listing to produce the scaled-out listing at a rate corresponding to the pinch-in velocity (FIGS. 7A-B and 8A-B). The listing is scaled 1860 to produce the scaled-out listing by an amount corresponding to the pinch-in magnitude (FIGS. 11A-B and 12A-B). Each of the scaling processes may be indicated at a particular pinch-in orientation. The method may be performed by the display 118, the multipoint touch-sensitive module 225, the scaling module 235, the processor 205, and storage module 210, or any further components and modules described herein.

Figure 19:
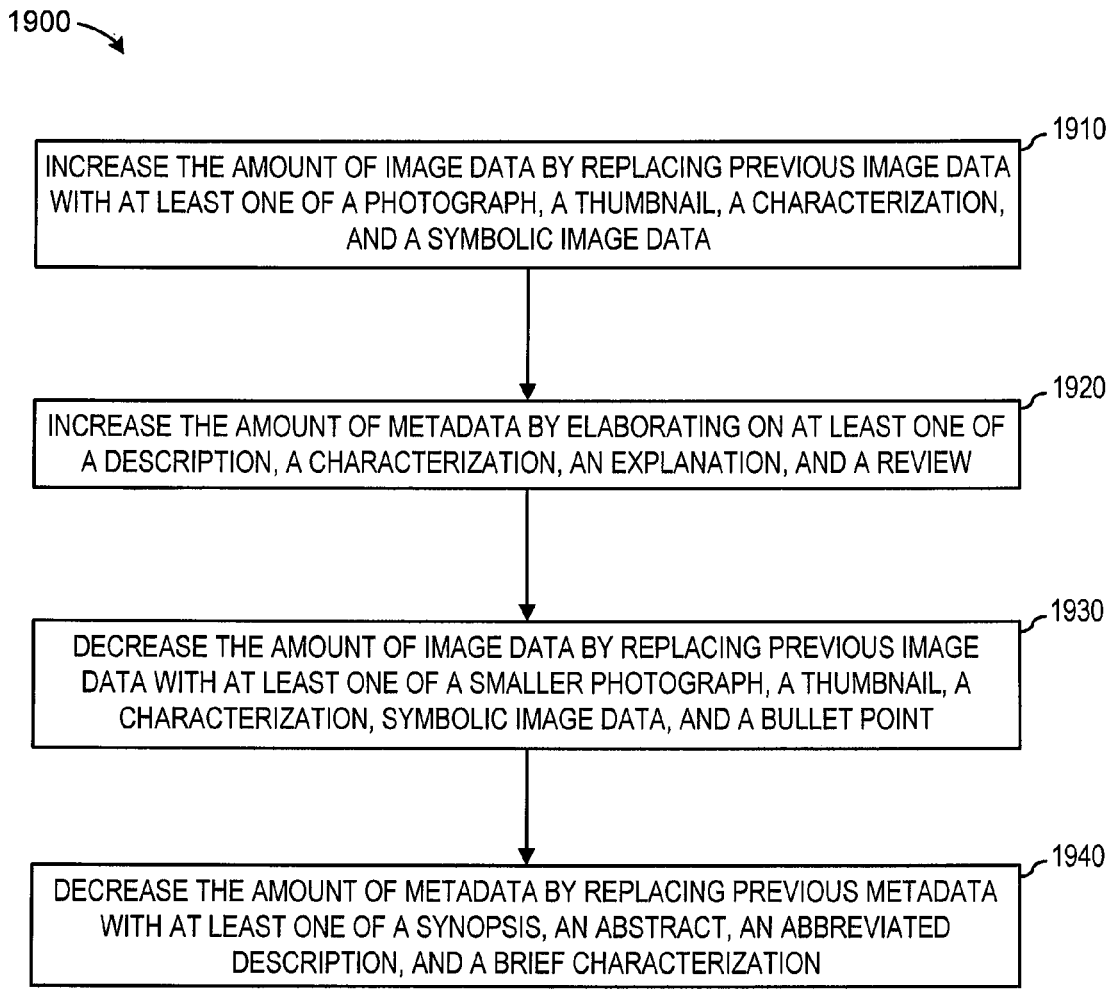
FIG. 19 is a flow chart illustrating a method to increase and decrease an amount of image data and metadata respectively, by replacing and elaborating on previous data, according to an example embodiment.

FIG. 19 depicts an example method to increase and decrease an amount of image data and metadata corresponding to an application of the pinch-out and the pinch-in gesture respectively (FIGS. 3A-B and 4A-B respectively), by replacing and elaborating or condensing previous data 1900. The method commences with increasing 1910 the amount of image data during application of the pinch-out gesture by replacing previous image data with at least one of a photograph, a thumbnail, a stylization, a characterization, and a symbolic image data. The method continues with increasing 1920 the amount of metadata during application of the pinch-out gesture by elaborating on at least one of a paragraph, a selection of sentences, a select phrase, a selection of words, and a heading.

The method goes on with decreasing 1930 the amount of image data, during application of the pinch-in gesture, by replacing previous image data with at least one of a thumbnail, a stylization, a characterization, symbolic image data, and a bullet point. The method concludes with decreasing 1940 the amount of metadata during application of the pinch-in gesture by replacing previous metadata with at least one of a selection of sentences, a select phrase, a selection of words, a heading, and a subject. The method, for example, may be performed by the display 118, the multipoint touch-sensitive module 225, the scaling module 235, the processor 205, and storage module 210, or any further components and modules described herein.

Figure 20:
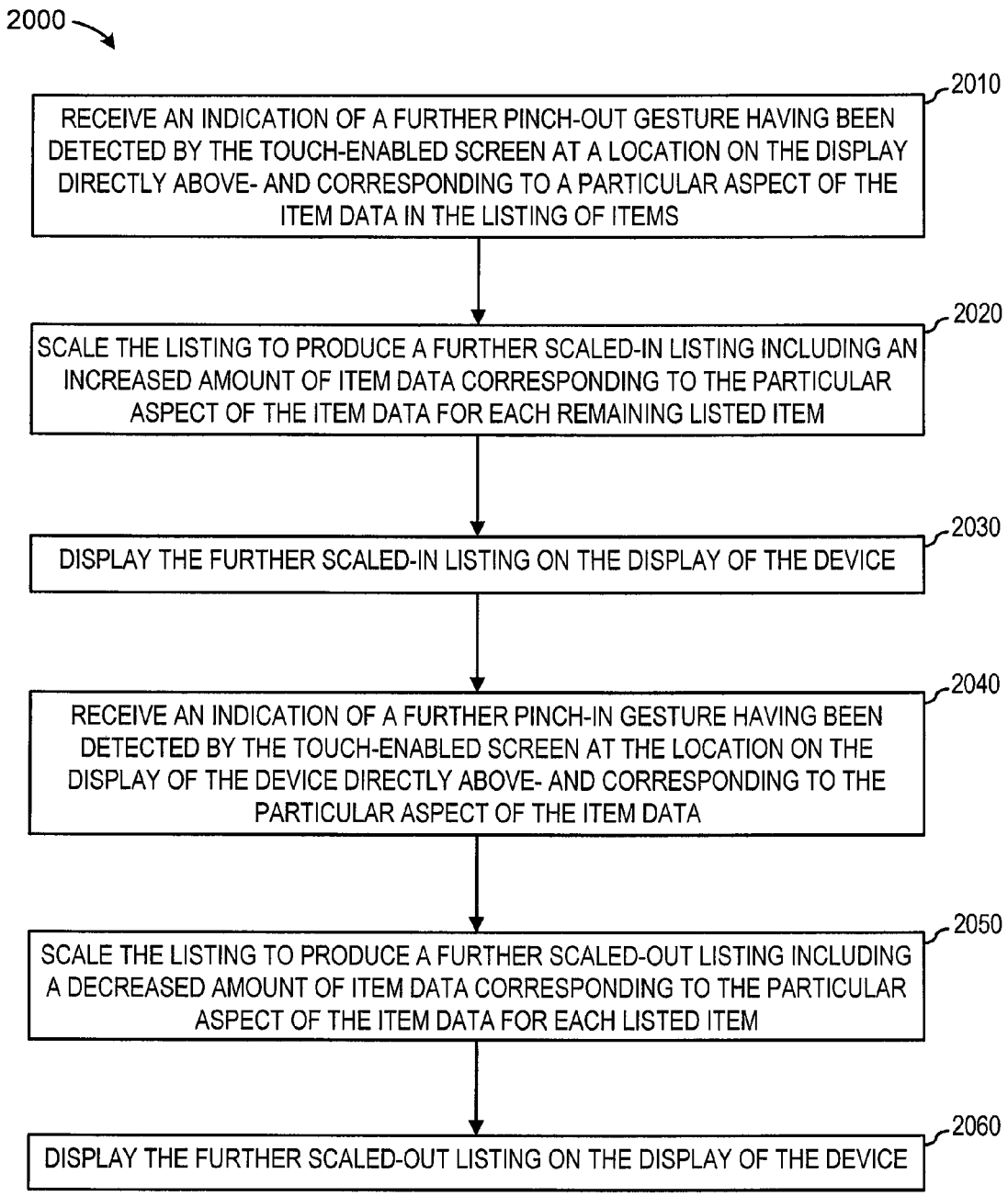
FIG. 20 is a flow chart illustrating a method to use a pinch-out gesture and a pinch-in gesture relating to two particular aspects of display data to scale a listing of items, according to an example embodiment.

FIG. 20 depicts an example method which uses a pinch-out gesture and a pinch-in gesture (corresponding to FIGS. 3A-B and 4A-B respectively) that relate to two particular aspects of display data to scale a listing of items 2000. The method commences with receiving 2010 an indication of a further pinch-out gesture having been detected by the touch-enabled screen 110 at a location on the display 118 directly above and corresponding to a particular aspect of the item data in the listing of items. The touch points of the gesture may be applied in either the image data region 315 or the metadata region 320 of the display 118. A touch point gesture applied in the image data region 315 may perform corresponding scaling processes with regard to the image data aspect of the item data. Similarly, a touch point gesture applied in the metadata region 320 may perform corresponding scaling processes with regard to the image data aspect of the item data.

The method continues where, in response to the indication of the further pinch-out gesture, the listing is scaled 2020 to produce a further scaled-in listing including an increased amount of item data corresponding to the particular aspect of the item data for each remaining listed item. In response to the production of the further scaled-in listing, the further scaled-in listing is caused 2030 to be displayed on the display 118 of the device. The method proceeds by receiving 2040 an indication of a further pinch-in gesture having been detected by the touch-enabled screen 110 at the location on the display 118 of the device directly above and corresponding to the particular aspect of the item data.

In response to the indication of the further pinch-in gesture, the method concludes by scaling 2050 the listing to produce a further scaled-out listing including a decreased amount of item data corresponding to the particular aspect of the item data for each listed item. In response to the production of the further scaled-out listing, the method proceeds by causing 2060 the further scaled-out listing to be displayed on the display 118 of the device. The method may be performed by the display 118, the multipoint touch-sensitive module 225, the scaling module 235, the processor 205, and storage module 210, or any further components and modules described herein.

Figure 21:
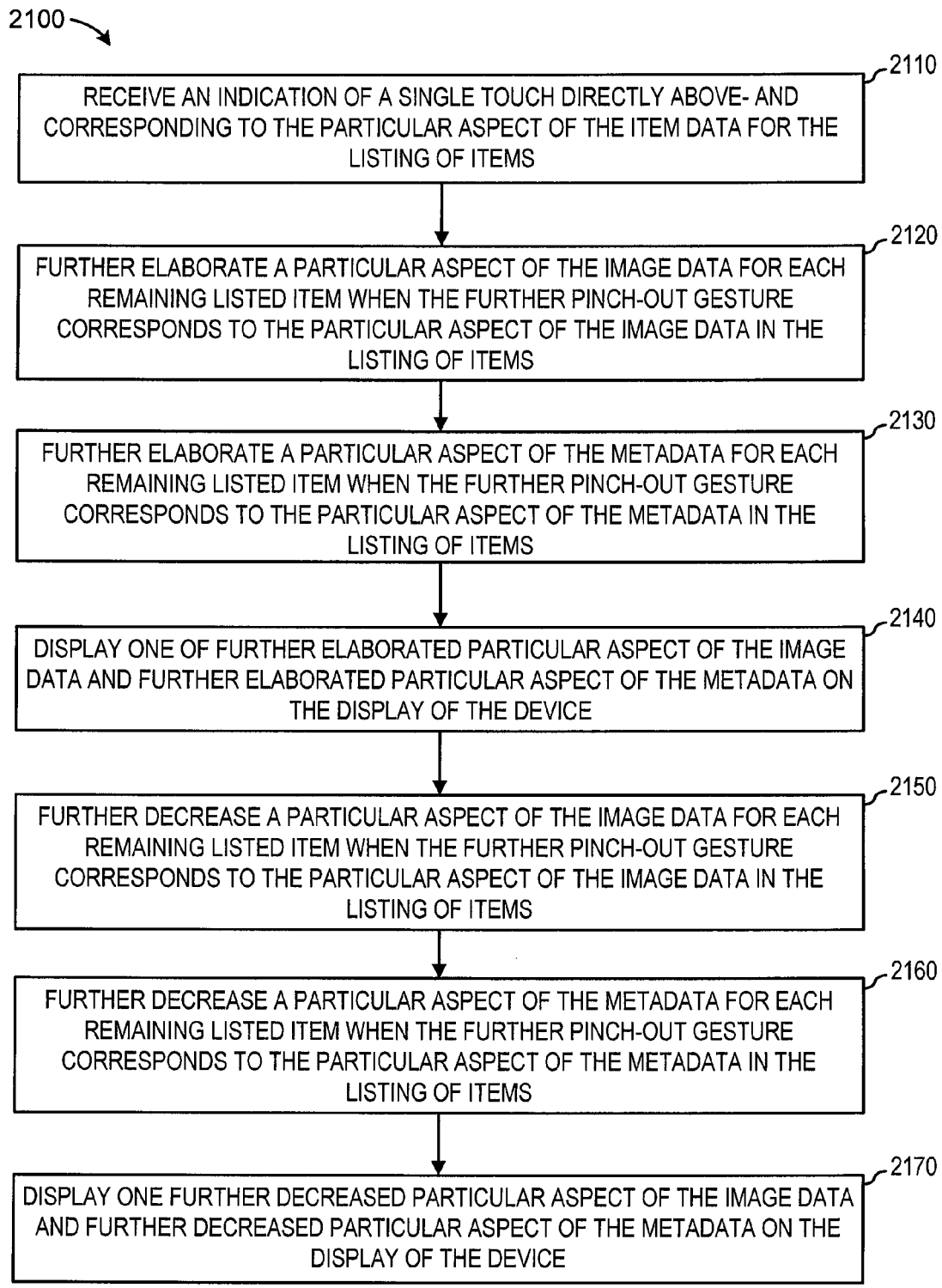
FIG. 21 is a flow chart illustrating a method to scale a listing of items to produce a further scaled-in listing or a further scaled-out listing corresponding to a further pinch-out gesture or a further pinch-in gesture respectively, according to an example embodiment.

FIG. 21 depicts an example method of scaling a listing of items according to a further pinch-out gesture and a further pinch-in gesture 2100 respectively (corresponding to FIGS. 3A,B and 4A,B respectively). The method commences with receiving 2110 an indication of a single touch (FIGS. 13A, 14A) directly above and corresponding to the particular aspect of the item data for the listing of items produced on the display 118 of the device. The single touch of either of the further gestures may be applied in either the image data region 315 or the metadata region 320 of the display 118. A touch and associated touch point gesture applied in the image data region 315 may perform corresponding scaling processes with regard to the image data aspect of the item data. Similarly, a single touch and associated touch point gesture applied in the metadata region 320 may perform corresponding scaling processes with regard to the metadata aspect of the item data.

The method continues by further elaborating 2120 a particular aspect of the image data for each remaining listed item when the further pinch-out gesture corresponds to the particular aspect of the image data (FIG. 13B) in the listing of items. The method continues by further elaborating 2130 a particular aspect of the metadata for each remaining listed item when the further pinch-out gesture corresponds to the particular aspect of the metadata (FIG. 14B) in the listing of items. The method then proceeds by causing 2140 one of further elaborated particular aspect of the image data and further elaborated particular aspect of the metadata to be displayed on the display 118 of the device.

The method proceeds by further decreasing 2150 a particular aspect of the image data for each remaining listed item when the further pinch-out gesture corresponds to the particular aspect of the image data in the listing of items and further decreasing 2160 a particular aspect of the metadata for each remaining listed item when the further pinch-out gesture corresponds to the particular aspect of the metadata in the listing of items. The method concludes by causing 2170 one of further decreased particular aspect of the image data and further decreased particular aspect of the metadata to be displayed on the display 118 of the device. The method may be performed, for example, by the display 118, the multipoint touch-sensitive module 225, the scaling module 235, the processor 205, and storage module 210, or any further components and modules described herein.

Figure 22:
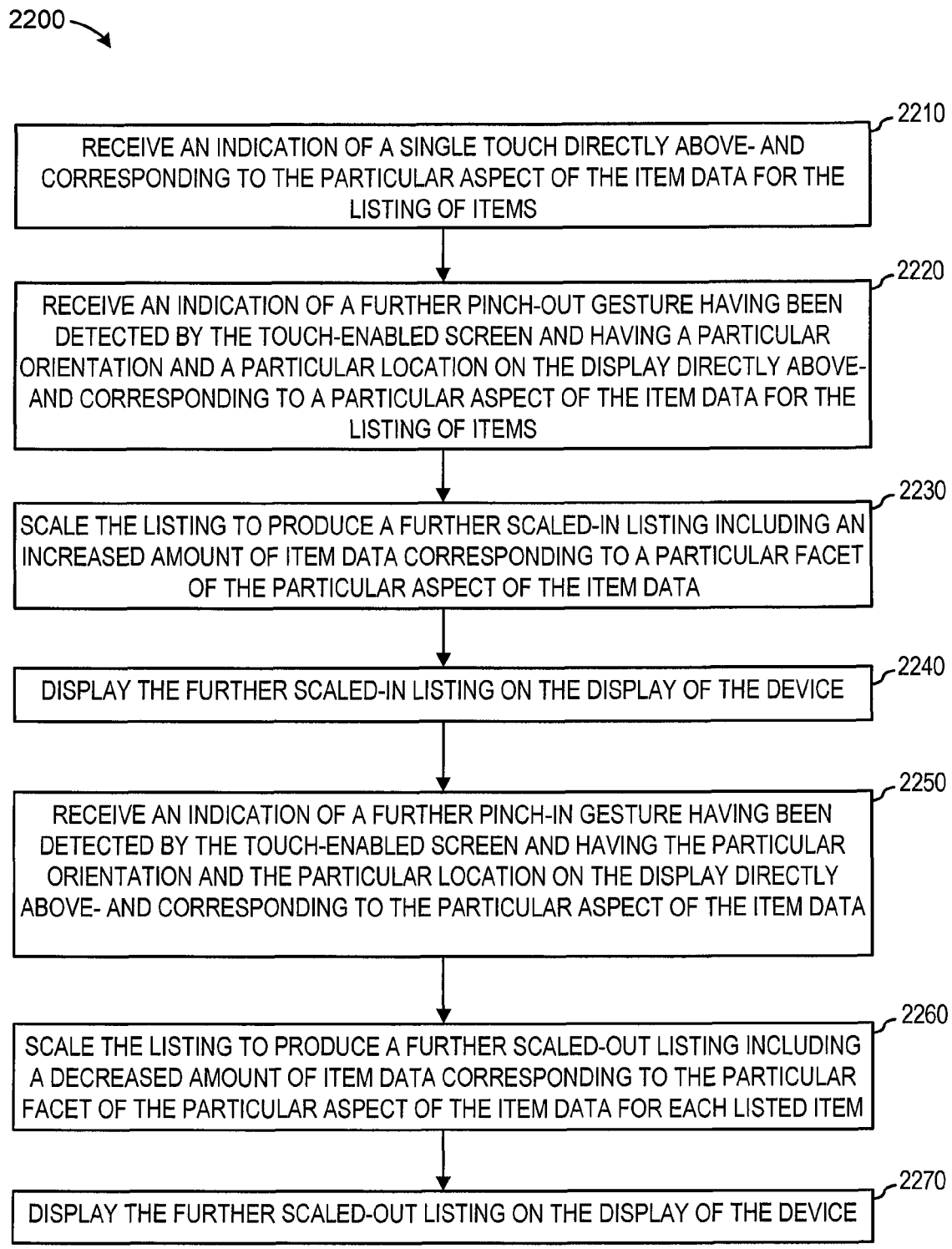
FIG. 22 is a flow chart illustrating a method to use a pinch-out gesture and a pinch-in gesture relating to a particular facet, of a particular aspect of display data to scale a listing of items, according to an example embodiment.

FIG. 22 depicts an example method of using a pinch-out gesture and a pinch-in gesture relating to a particular facet 2200 of a particular aspect of display data to scale a listing of items. The method commences by receiving 2210 an indication of a single touch directly above and corresponding to the particular aspect of the item data for the listing of items. The single touch may be produced directly over the metadata region 320 (FIG. 15A), for example.

The method continues with receiving 2220 an indication of a further pinch-out gesture having been detected by the touch-enabled screen 110, the indication having a particular orientation and a particular location on the display 118 directly above and corresponding to a particular aspect of the item data for the listing of items. The further pinch-out gesture may be produced directly over the metadata region 320 (FIG. 15B), for example. A horizontal application of the pinch-out gesture may result in an elaboration of a date facet of the metadata aspect of the item data. The metadata region 320 may correspondingly show a further elaboration of the metadata spanning backward in time from an initial temporal indicator to a prior temporal indicator within the sentence-level abstraction. The pinch-out gesture may be applied within a range of fifteen to thirty degrees of a horizontal axis of the display 118.

In response to the indication of the further pinch-out gesture, the method scales 2230 the listing to produce a further scaled-in listing including a further amount of item data corresponding to a facet of the particular aspect of the item data. For example, the initial temporal indicator may be July 2009 and the prior temporal indicator may be May 2008 subsequent to the horizontal application of the pinch-out gesture. In response to the production of the further scaled-in listing, the method causes 2240 the further scaled-in listing to be displayed on the display 118 of the device.

The method proceeds by receiving 2250 an indication of a further pinch-in gesture having been detected by the touch-enabled screen 110, the indication having the particular orientation and the particular location on the display 118 directly above and corresponding to the particular aspect of the item data for the listing of items. The further pinch-in gesture may be produced directly over the metadata region 320 (FIG. 16B), for example. Note that the further pinch-in gesture may have been preceded by receiving 2210 an indication of a single touch directly above and corresponding to the particular aspect of the item data for the listing of items. The single touch may be produced directly over the metadata region 320 (FIG. 16A), for example.

A horizontal application of the further pinch-in gesture may result in an elaboration of the date facet of the metadata aspect of the item data complementary to the horizontal application of the pinch-out gesture. Subsequent to application of the pinch-in gesture, the metadata region 320 may show a further elaboration of the metadata spanning forward in time from an initial temporal indicator to a later temporal indicator within the sentence-level abstraction. The pinch-in gesture may be applied within a range of fifteen to thirty degrees of the horizontal axis of the display 118.

In response to the indication of the further pinch-in gesture, the method scales 2260 the listing to produce a further scaled-out listing including a further amount of item data corresponding to the facet of the particular aspect of the item data for each listed item. For example, the initial temporal indicator may be July 2009 and the later temporal indicator may be April 2011 subsequent to the horizontal application of the pinch-in gesture. In response to the production of the further scaled-out listing, the method causes 2270 the further scaled-out listing to be displayed on the display 118 of the device. The method may be performed, for example, by the display 118, the multipoint touch-sensitive module 225, the scaling module 235, the processor 205, and storage module 210, or any further components and modules described herein.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations.

Whether temporarily or permanently configured, such processors may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 23:
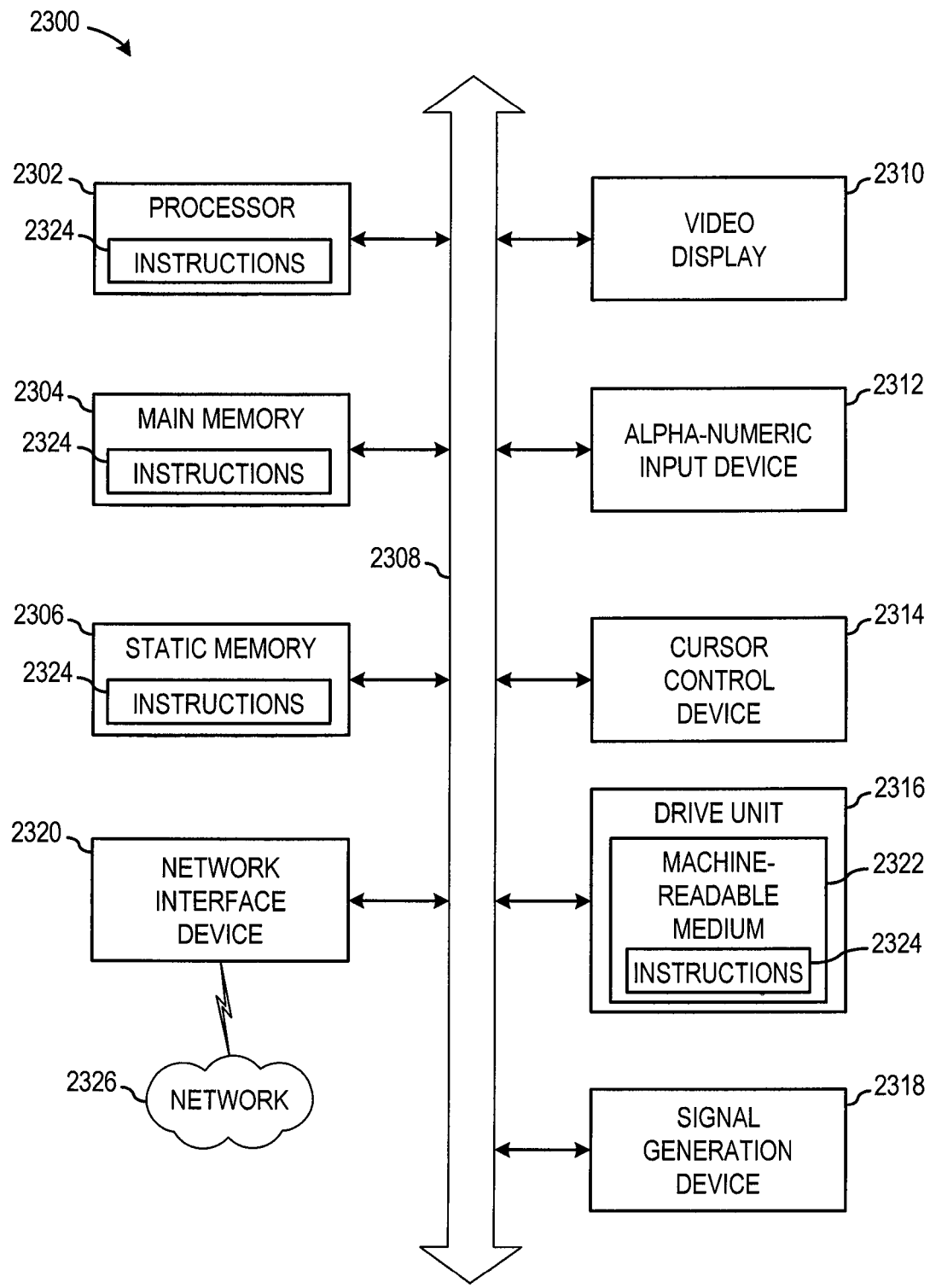
FIG. 23 is a block diagram of machine in the example form of a computer system within which is a set of instructions, for causing the machine to perform any one or more of the methodologies discussed herein, that may be executed.

FIG. 23 is a block diagram of machine in the example form of a computer system 2300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2300 includes a processor 2302 (e.g., a central processing unit (CPU), a graphics processing unit (GPU) or both), a main memory 2304 and a static memory 2306, which communicate with each other via a bus 2308. The computer system 2300 may further include a video display unit 2310 (e.g., a liquid crystal display (LCD) or a cathode ray tube (CRT)). The computer system 2300 also includes an alphanumeric input device 2312 (e.g., a keyboard), a user interface (UI) navigation device 2314 (e.g., a mouse), a disk drive unit 2316, a signal generation device 2318 (e.g., a speaker) and a network interface device 2320.

Machine-Readable Medium

The disk drive unit 2316 includes a machine-readable medium 2322 on which is stored one or more sets of instructions and data structures (e.g., software) 2324 embodying or utilized by any one or more of the methodologies or functions described herein. The instructions 2324 may also reside, completely or at least partially, within the main memory 2304 and/or within the processor 2302 during execution thereof by the computer system 2300, the main memory 2304 and the processor 2302 also constituting machine-readable media.

While the machine-readable medium 2322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices;

magnetic disks such as internal hard disks and removable disks; magneto-optical disks; and CD-ROM and DVD-ROM disks.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    identifying search results based on a search, the search results including a plurality of items, each respective item including item data including image data and metadata, the item data including initial item data;
    causing an item listing to be displayed on a display of a device having a touch-enabled screen, the item listing including, for each respective listed item, the initial item data including a concurrent display of an initial image of the item and corresponding initial metadata describing the item;
    receiving an indication of a pinch-out gesture having been detected by the touch-enabled screen of the device;
    in response to the indication of the pinch-out gesture, scaling the item listing to produce a scaled-in listing including fewer of the items and an increased amount of the image data causing a more detailed refinement of the initial image and an increased amount of the corresponding metadata causing a more detailed refinement of the initial metadata for each remaining listed item;
    in response to the production of the scaled-in listing, causing the scaled-in listing to be displayed as a concurrent presentation of the increased amount of the image data causing a more detailed refinement of the initial image and the increased amount of the metadata causing a more detailed refinement of the initial metadata on the display of the device;
    receiving an indication of a further pinch-out gesture having been detected by the touch-enabled screen at a location on the display directly above and corresponding to a particular aspect of the initial item data in the item listing;
    in response to the indication of the further pinch-out gesture, scaling the listing to produce a further scaled-in listing including an increased amount of item data for the initial item data and corresponding to the particular aspect of the initial item data for each remaining listed item;
    in response to the production of the further scaled-in listing, causing the further scaled-in listing to be displayed on the display of the device, the scaling the listing to produce the further scaled-in listing further includes:
        further elaborating a particular aspect of one of the initial image data and the initial metadata for each remaining listed item responsive to identifying the further pinch-out gesture corresponds to the particular aspect of the respective one of the initial image data and the initial metadata in the item listing; and
        causing the further elaborated particular aspect of one of the initial image data and the initial metadata to be displayed on the display of the device.

2. The method of claim 1, wherein the indication of a pinch-out gesture includes a pinch-out velocity, a pinch-out magnitude, and a pinch-out orientation being a velocity, a distance, and an angle respectively, according to which the distance between the first touch point and the second touch point increases and further including at least one of:
    scaling the listing to produce the scaled-in listing at a rate corresponding to the pinch-out velocity; and
    scaling the listing to produce the scaled-in listing by an amount corresponding to the pinch-out magnitude,
    the at least one of scaling the listing to produce the scaled-in listing at a rate and scaling the listing to produce the scaled-in listing by an amount, indicated by a particular pinch-out orientation.

3. The method of claim 1, wherein scaling the listing to produce the scaled-in listing for each remaining listed item further includes:
    increasing the amount of the image data by replacing previous image data with at least one of a photograph, a thumbnail, a stylization, a characterization, and a symbolic image data, each initial image being more refined; and
    increasing the amount of the metadata by replacing previous metadata with at least one of a paragraph, a selection of sentences, a select phrase, a selection of words, or a heading, each initial metadata being more refined.

4. The method of claim 1,
    wherein the particular aspect of the initial item data for the item listing is further indicated by at least one of:
    the indication of the further pinch-out gesture including a pinch-out orientation being within a range of fifteen to thirty degrees of vertical; and
    further comprising receiving an indication of a single touch directly above and corresponding to the particular aspect of the initial item data for the item listing.

5. The method of claim 1, further comprising:
    receiving an indication of a pinch-in gesture having been detected by the touch-enabled screen of the device;
    in response to the indication of the pinch-in gesture, scaling the item listing to produce a scaled-out listing including more of the items, the scaled-out listing including representing the initial image with a decreased amount of image data and representing the initial metadata with a decreased amount of corresponding metadata for each listed item; and in response to the production of the scaled-out listing, causing the scaled-out listing to be displayed as a concurrent presentation of the decreased amount of item image data and the decreased amount of corresponding metadata on the display of the device.

6. The method of claim 5, wherein the indication of a pinch-in gesture includes a pinch-in velocity, a pinch-in magnitude, and a pinch-in orientation being a velocity, a distance, and an angle respectively, according to which the distance between the first touch point and the second touch point decreases and further including at least one of:
scaling the listing to produce the scaled-out listing at a rate corresponding to the pinch-in velocity; and
scaling the listing to produce the scaled-out listing by an amount corresponding to the pinch-in magnitude,
the at least one of scaling the listing to produce the scaled-out listing at a rate and scaling the listing to produce the scaled-out listing by an amount, indicated by a particular pinch-in orientation.

7. The method of claim 5, wherein scaling the listing to produce the scaled-out listing for each listed item further includes:
decreasing the amount of image data by replacing previous image data by representing the initial image with at least one of a thumbnail, a stylization, a characterization, symbolic image data, or a bullet point; and
decreasing the amount of metadata by replacing the initial metadata with at least one of a selection of sentences, a select phrase, a selection of words, a heading, or a subject.

8. The method of claim 5, further comprising:
receiving an indication of a further pinch-in gesture having been detected by the touch-enabled screen at a location on the display of the device directly above and corresponding to a particular aspect of the initial item data in the item listing;
in response to the indication of the further pinch-in gesture, scaling the listing to produce a further scaled-out listing including representing the initial item data with a decreased amount of item data corresponding to the particular aspect of the initial item data for each listed item; and
in response to the production of the further scaled-out listing, causing the further scaled-out listing to be displayed on the display of the device,
wherein the particular aspect of the initial item data for the item listing is further indicated by at least one of:
the indication of the further pinch-in gesture including a pinch-in orientation being within a range of fifteen to thirty degrees of vertical; and
receiving an indication of a single touch directly above and corresponding to the particular aspect of the initial item data for the item listing.

9. The method of claim 8, wherein scaling the listing to produce the further scaled-out listing further includes:
further decreasing a particular aspect of one of the initial image data and the initial metadata for each remaining listed item when the further pinch-in gesture corresponds to the particular aspect of the respective one of the initial image data and the initial metadata in the item listing; and
causing the further decreased particular aspect of one of the initial image data and the initial metadata to be displayed on the display of the device.

10. The method of claim 5, further comprising:
receiving an indication of a further pinch-in gesture having been detected by the touch-enabled screen, the indication having the particular orientation and the particular location on the display directly above and corresponding to a particular aspect of the initial item data for the item listing;
in response to the indication of the further pinch-in gesture, scaling the listing to produce a further scaled-out listing including a further amount of scaled-out item data corresponding to a facet of the particular aspect of the initial item data for each listed item; and
in response to the production of the further scaled-out listing, displaying the further scaled-out listing on the display of the device,
wherein the particular aspect of the initial item data for the item listing is further indicated by at least one of:
the indication of the further the further pinch-in gesture including a pinch-in orientation being within a range of fifteen to thirty degrees of horizontal; and
receiving an indication of a single touch directly above and corresponding to the particular aspect of the initial item data for the item listing.

11. The method of claim 1, wherein the particular aspect includes the initial metadata including an initial temporal indicator.

12. The method of claim 11, further comprising:
scaling the initial temporal indicator of the metadata for the specific item in the item listing to show metadata extending backward in time in relation to the initial temporal indicator of the specific item without changing the image data for the specific item.

13. The method of claim 12, wherein the metadata is extending backward in time by an amount that is proportional to a magnitude of the pinch-out gesture.

14. A machine-readable medium not comprising transitory propagating signals and embodying a set of instructions, that when executed by at least one processor of a device having a touch-enabled screen, causes the at least one processor to perform operations comprising:
identifying search results based on a search, the search results including a plurality of items, each respective item including item data including image data and metadata, the item data including initial item data;
causing an item listing to be displayed on a display of the device, the item listing including, for each respective listed item, initial item data including a concurrent display of an initial image of the item and corresponding initial metadata describing the item;
receiving an indication of a pinch-out gesture having been detected by the ouch-enabled screen of the device;
in response to the indication of the pinch-out gesture, scaling the item listing to produce a scaled-in listing including fewer of the items and an increased amount of image data causing a more detailed refinement of the initial image and an increased amount of corresponding metadata causing a more detailed refinement of the initial metadata for each remaining listed item;
in response to the production of the scaled-in listing, causing the scaled-in listing to be displayed as a concurrent presentation of the increased amount of the image data causing a more detailed refinement of the initial image and the increased amount of the metadata causing a more detailed refinement of the initial metadata on the display of the device;
receiving an indication of a further pinch-out gesture having been detected by the touch-enabled screen at a location on the display directly above and corresponding to a particular aspect of the initial item data in the item listing;

in response to the indication of the further pinch-out gesture, scaling the listing to produce a further scaled-in listing including an increased amount of item data for the initial item data and corresponding to the particular aspect of the initial item data for each remaining listed item;

in response to the production of the further scaled-in listing, causing the further scaled-in listing to be displayed on the display of the device, the scaling the listing to produce the further scaled-in listing further includes:

further elaborating a particular aspect of one of the initial image data and the initial metadata for each remaining listed item responsive to identifying the further pinch-out gesture corresponds to the particular aspect of the respective one of the initial image data and the initial metadata in the item listing; and causing the further elaborated particular aspect of one of the initial image data and the initial metadata to be displayed on the display of the device.

15. The machine-readable medium not comprising transitory propagating signals of claim 14, wherein the indication of a pinch-out gesture includes a pinch-out velocity, a pinch-out magnitude, and a pinch-out orientation being a velocity, a distance, and an angle respectively, according to which the distance between the first touch point and the second touch point increases and further including at least one of:

scaling the listing to produce the scaled-in listing at a rate corresponding to the pinch-out velocity; and scaling the listing to produce the scaled-in listing by an amount corresponding to the pinch-out magnitude, the at least one of scaling the listing to produce the scaled-in listing at a rate and scaling the listing to produce the scaled-in listing by an amount, indicated by a particular pinch-out orientation.

16. The machine-readable medium not comprising transitory propagating signals of claim 14, wherein scaling the listing to produce the scaled-in listing for each remaining listed item further includes:

increasing the amount of the image data by replacing previous image data with at least one of a photograph, a thumbnail, a stylization, a characterization, and a symbolic image data, each initial image is more refined; and increasing the amount of metadata by replacing previous metadata with at least one of a paragraph, a selection of sentences, a select phrase, a selection of words, or a heading, each initial metadata is more refined.

17. The machine-readable medium not comprising transitory propagating signals of claim 14, wherein the particular aspect of the initial item data for the item listing is further indicated by at least one of:

the indication of the further pinch-out gesture including a pinch-out orientation being within a range of fifteen to thirty degrees of vertical; and receiving an indication of a single touch directly above and corresponding to the particular aspect of the initial item data for the item listing.

18. The machine-readable medium not comprising transitory propagating signals of claim 14, wherein the operations further comprise:

receiving an indication of a pinch-in gesture having been detected by the touch-enabled screen of the device;

in response to the indication of the pinch-in gesture, scaling the item listing to produce a scaled-out listing including more of the items, the scaled-out listing including representing the initial image with a decreased amount of image data and representing the initial metadata with a decreased amount of corresponding metadata for each listed item; and in response to the production of the scaled-out listing, causing the scaled-out listing to be displayed as a concurrent presentation of the decreased amount of item image data and the decreased amount of corresponding metadata on the display of the device.

19. The machine-readable medium not comprising transitory propagating signals of claim 18, wherein the indication of a pinch-in gesture includes a pinch-in velocity, a pinch-in magnitude, and a pinch-in orientation being a velocity, a distance, and an angle respectively, according to which the distance between the first touch point and the second touch point decreases and further including at least one of:

scaling the listing to produce the scaled-out listing at a rate corresponding to the pinch-in velocity; and scaling the listing to produce the scaled-out listing by an amount corresponding to the pinch-in magnitude, the at least one of scaling the listing to produce the scaled-out listing at a rate and scaling the listing to produce the scaled-out listing by an amount, indicated by a particular pinch-in orientation.

20. The machine-readable medium not comprising transitory propagating signals of claim 18, wherein scaling the listing to produce the scaled-out listing for each listed item further includes:

decreasing the amount of image data by replacing previous image data by representing the initial image with at least one of a thumbnail, a stylization, a characterization, symbolic image data, or a bullet point; and decreasing the amount of metadata by replacing the initial metadata with at least one of a selection of sentences, a select phrase, a selection of words, a heading, or a subject.

21. The machine-readable medium not comprising transitory propagating signals of claim 18, wherein the operations further comprise:

receiving an indication of a further pinch-in gesture having been detected by the touch-enabled screen at a location on the display of the device directly above and corresponding to a particular aspect of the initial item data in the item listing;

in response to the indication of the further pinch-in gesture, scaling the listing to produce a further scaled-out listing including representing the initial item data with a decreased amount of item data corresponding to the particular aspect of the initial item data for each listed item; and in response to the production of the further scaled-out listing, causing the further scaled-out listing to be displayed on the display of the device, wherein the particular aspect of the initial item data for the item listing is further indicated by at least one of:

the indication of the further pinch-in gesture including a pinch-in orientation being within a range of fifteen to thirty degrees of vertical; and receiving an indication of a single touch directly above and corresponding to the particular aspect of the initial item data for the item listing.

22. The machine-readable medium not comprising transitory propagating signals of claim 21, wherein scaling the listing to produce the further scaled-out listing further includes:

further decreasing a particular aspect of one of the initial image data and the initial metadata for each remaining listed item when the further pinch-in gesture corresponds to the particular aspect of the respective one of the initial image data and the initial metadata in the item listing; and causing the further decreased particular aspect of one of the initial image data and the initial metadata to be displayed on the display of the device.

23. The machine-readable medium not comprising transitory propagating signals of claim 18, wherein the operations further comprise:

receiving an indication of a further pinch-in gesture having been detected by the touch-enabled screen, the indication having the particular orientation and the particular location on the display directly above and corresponding to a particular aspect of the initial item data for the item listing;

in response to the indication of the further pinch-in gesture, scaling the listing to produce a further scaled-out listing including a further amount of scaled-out item data corresponding to a facet of the particular aspect of the initial item data for each listed item; and in response to the production of the further scaled-out listing, displaying the further scaled-out listing on the display of the device, wherein the particular aspect of the initial item data for the item listing is further indicated by at least one of:

the indication of the further the further pinch-in gesture including a pinch-in orientation being within a range of fifteen to thirty degrees of horizontal; and receiving an indication of a single touch directly above and corresponding to the particular aspect of the initial item data for the item listing.

24. A system comprising:

a processor configured to identify search results based on a search, the search results including a plurality of items, each respective item including item data including image data and metadata, the item data including initial item data;

a display including a touch-enabled screen transparently overlaying at least a portion of the display, a processor configured to cause an item listing to be displayed on a display of a device that has a touch-enabled screen, the item listing including, for each respective listed item, the initial item data including a concurrent display of an initial image of the item and that corresponds to initial metadata that describes the item;

a touch-sensitive module communicatively coupled to the touch-enabled screen and configured to receive an indication of the pinch-out gesture that has been detected by the touch-enabled screen;

a storage module to store the item listing; and a scaling module configured to scale the item listing in response to the pinch-out gesture and produce a scaled-in listing including fewer of the items and an increased amount of the image data to cause a more detailed refinement of the initial image and an increased amount of the corresponding metadata to cause a more detailed refinement of the initial metadata for each remaining listed item, the scaling module is further configured to display a concurrent presentation of the increased amount of the image data causing a more detailed refinement of the initial image and the increased amount of the corresponding metadata to cause a more detailed refinement of the initial metadata on the display for each item listed, the scaling module is further configured to receive an indication of a further pinch-out gesture that has been detected by the touch enabled screen at a location on the display directly above and corresponds to a particular aspect of the initial item data in the item listing, in response to the indication of the further pinch-out gesture, the scaling module is further configured to scale the listing to produce a further scaled-in listing including an increased amount of item data for the initial item data and corresponding to the particular aspect of the initial item data for each remaining listed item, in response to the production of the further scaled-in listing, the scaling module is further configured to cause the further scaled-in listing to be displayed on the display of the device, the scaling module is further configured to further elaborate a particular aspect of one of the initial image data and the initial metadata for each remaining listed item responsive to an identification that the further pinch-out gesture corresponds to the particular aspect of the respective one of the initial image data and the initial metadata in the item listing, the scaling module is further configured to cause the further elaborated particular aspect of one of the initial image data and the initial metadata to be displayed on the display of the device.

* * * * *